(12) United States Patent
Bundy et al.

(10) Patent No.: US 7,242,669 B2
(45) Date of Patent: Jul. 10, 2007

(54) METHOD AND SYSTEM FOR MULTI-PATH ROUTING OF ELECTRONIC ORDERS FOR SECURITIES

(75) Inventors: Michael Bundy, Katy, TX (US); Irfan Amanat, New York, NY (US); Vladimir Goldfeld, New York, NY (US)

(73) Assignee: **E*Trade Financial Corporation**, New York, NY (US)

( * ) Notice: Subject to any disclaimer, the term of this patent is extended or adjusted under 35 U.S.C. 154(b) by 1590 days.

(21) Appl. No.: 09/729,527

(22) Filed: Dec. 4, 2000

(65) Prior Publication Data

US 2002/0103732 A1    Aug. 1, 2002

(51) Int. Cl.
H04J 1/16 (2006.01)
H04L 12/28 (2006.01)
G06Q 40/00 (2006.01)

(52) U.S. Cl. .................. 370/252; 370/351; 370/400; 705/37

(58) Field of Classification Search ............. 370/238, 370/351, 401, 252, 400; 705/35, 1, 37
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 3,976,840 A | 8/1976 | Cleveland et al. |
| 4,243,844 A | 1/1981 | Waldman |
| 4,412,287 A | 10/1983 | Braddock, III |
| 4,585,130 A | 4/1986 | Brennan |
| 4,588,192 A | 5/1986 | Laborde |
| 4,674,044 A | 6/1987 | Kalmus et al. |
| 4,677,552 A | 6/1987 | Sibley, Jr. |
| 4,750,135 A | 6/1988 | Boilen |
| 4,751,640 A | 6/1988 | Lucas et al. |
| 4,903,201 A | 2/1990 | Wagner |
| 4,949,248 A | 8/1990 | Caro |
| 5,025,372 A | 6/1991 | Burton et al. |
| 5,038,284 A | 8/1991 | Kramer |
| 5,101,353 A | 3/1992 | Lupien et al. |
| 5,136,501 A | 8/1992 | Silverman et al. |
| 5,168,446 A | 12/1992 | Wiseman |
| 5,267,148 A | 11/1993 | Kosaka et al. |
| 5,270,922 A | 12/1993 | Higgins |
| 5,297,031 A | 3/1994 | Gutterman et al. |
| 5,297,032 A | 3/1994 | Trojan et al. |
| 5,339,392 A | 8/1994 | Risberg et al. |
| 5,361,199 A | 11/1994 | Shoquist et al. |
| 5,375,055 A | 12/1994 | Togher et al. |
| 5,500,889 A | 3/1996 | Baker et al. |

(Continued)

Primary Examiner—Chau Nguyen
Assistant Examiner—Nittaya Juntima
(74) Attorney, Agent, or Firm—Conley Rose, P.C.

(57) ABSTRACT

Methods and systems for selecting, in a broker-dealer system for automated trading of securities, a path for sending an order for securities to a terminus market, in which the broker-dealer system includes at least one port, the port being coupled through at least one path to at least one terminus market, wherein each path includes at least one direct link between a port and a market system and optionally one or more additional links between the said market system and other market systems, each path having a first terminus at a port and a second terminus at a terminus market, terminus markets being markets to which orders for securities are sent by the broker-dealer system.

65 Claims, 20 Drawing Sheets

U.S. PATENT DOCUMENTS

| | | |
|---|---|---|
| 5,508,913 A | 4/1996 | Yamamoto et al. |
| 5,517,406 A | 5/1996 | Harris et al. |
| 5,557,517 A | 9/1996 | Daughtery, III |
| 5,563,783 A | 10/1996 | Stolfo et al. |
| 5,640,569 A | 6/1997 | Miller et al. |
| 5,655,088 A | 8/1997 | Midorikawa et al. |
| 5,689,652 A | 11/1997 | Lupien et al. |
| 5,727,165 A | 3/1998 | Ordish et al. |
| 5,752,237 A | 5/1998 | Cherny |
| 5,774,880 A | 6/1998 | Ginsberg |
| 5,788,234 A | 8/1998 | Siofer |
| 5,799,287 A | 8/1998 | Dembo |
| 5,806,048 A | 9/1998 | Kiron et al. |
| 5,809,483 A | 9/1998 | Broka et al. |
| 5,819,237 A | 10/1998 | Garman |
| 5,819,238 A | 10/1998 | Fernholz |
| 5,845,266 A | 12/1998 | Lupien et al. |
| 5,852,808 A | 12/1998 | Cherny |
| 5,857,176 A | 1/1999 | Ginsberg |
| 5,875,108 A | 2/1999 | Hoffberg et al. |
| 5,901,246 A | 5/1999 | Hoffberg et al. |
| 5,905,974 A | 5/1999 | Fraser et al. |
| 5,924,083 A | 7/1999 | Silverman et al. |
| 5,940,810 A | 8/1999 | Traub et al. |
| 5,946,667 A | 8/1999 | Tull, Jr. et al. |
| 5,950,176 A | 9/1999 | Keiser et al. |
| 6,201,810 B1 * | 3/2001 | Masuda et al. ......... 370/395.32 |
| 6,347,078 B1 * | 2/2002 | Narvaez-Guarnieri et al. ...................... 370/230 |
| 6,400,681 B1 * | 6/2002 | Bertin et al. ................ 370/218 |
| 6,553,423 B1 * | 4/2003 | Chen ......................... 709/230 |
| 6,633,544 B1 * | 10/2003 | Rexford et al. ............. 370/238 |
| 6,687,230 B1 * | 2/2004 | Furutono et al. ........... 370/238 |
| 6,947,390 B2 * | 9/2005 | Hundscheidt et al. ....... 370/252 |
| 2002/0023040 A1 * | 2/2002 | Gilman et al. ................ 705/37 |

* cited by examiner

PATH TABLE 1

| | PORT CODE | TERM MKT | HOP COUNT | LATENCY |
|---|---|---|---|---|
| 150 → | ISLD | ISLD | 1 | 0.03 |
| 152 → | SNET | SNET | 1 | 0.05 |
| 154 → | SNET | SOES | 2 | 0.10 |
| 156 → | SNET | REDI | 2 | 0.15 |
| 158 → | ROUTER2 | ISLD | 2 | 0.20 |

108    110

PATH TABLE 2

| | PORT CODE | TERM MKT | HOP COUNT | LATENCY |
|---|---|---|---|---|
| 160 → | ISLD | ISLD | 1 | 0.03 |
| 162 → | ROUTER1 | ISLD | 2 | 0.20 |
| 164 → | ROUTER1 | SNET | 2 | 0.15 |
| 166 → | ROUTER1 | SOES | 3 | 0.25 |
| 168 → | ROUTER1 | REDI | 3 | 0.30 |

FIG. 1B

CONFIGURATION FILE 1

| PORT CODE | TERM MKT | HOP COUNT | LATENCY |
|---|---|---|---|
| SNET | SNET | 1 | 0.05 |
| SNET | SOES | 2 | 0.10 |
| SNET | REDI | 2 | 0.15 |

CONFIGURATION FILE 2

| PORT CODE | TERM MKT | HOP COUNT | LATENCY |
|---|---|---|---|
| ISLD | ISLD | 1 | 0.03 |

CONFIGURATION FILE 3

| PORT CODE | TERM MKT | HOP COUNT | LATENCY |
|---|---|---|---|
| ISLD | ISLD | 1 | 0.03 |

FIG. 1C

CONFIGURATION FILE 1

| TERM MKT | HOP COUNT | LATENCY |
|---|---|---|
| 151 → SNET | 0 | 0.00 |
| 152 → SNET | 1 | 0.05 |
| 154 → SOES | 2 | 0.10 |
| 156 → REDI | 2 | 0.15 |

171

CONFIGURATION FILE 2

| TERM MKT | HOP COUNT | LATENCY |
|---|---|---|
| 149 → ISLD | 0 | 0.00 |
| 150 → ISLD | 1 | 0.03 |

173

CONFIGURATION FILE 3

| TERM MKT | HOP COUNT | LATENCY |
|---|---|---|
| 161 → ISLD | 0 | 0.00 |
| 160 → ISLD | 1 | 0.03 |

PATH DATA STRUCTS

| TERM MKT | PORT CODE | COMBO |
|---|---|---|
| ISLD | SNET | 0.0 ← ENCODE OVERRIDE |
| ISLD | REDI | 2.1 |
| ISLD | ISLD | 3.5 |

1418 points to first ISLD row; 1426 points to COMBO header.

PATH DATA STRUCTS (1424)

| TERM MKT | PORT CODE | HOP COUNT | LATENCY |
|---|---|---|---|
| ISLD | SNET | 2 | 0.75 |
| ISLD | REDI | 3 | 0.55 |
| ISLD | ISLD | 0 ← ENCODE OVERRIDE | 0.05 |

1420 points to last ISLD row.

PATH DATA STRUCTS

| TERM MKT | PORT CODE | LATENCY |
|---|---|---|
| ISLD | SNET | 0.75 |
| ISLD | REDI | 0.00 ← ENCODE OVERRIDE |
| ISLD | ISLD | 0.05 |

1422 points to REDI row; 1428 points to LATENCY header.

FIG. 14A

METHOD AND SYSTEM FOR MULTI-PATH ROUTING OF ELECTRONIC ORDERS FOR SECURITIES

BACKGROUND

Systems for automated trading of securities need to be fast, reliable, and flexible. Delays in execution of orders for securities affect different investors differently. Viewed according to their interest in speed of execution, investors can be classified in three broad categories: traditional investors, hyperactive investors, and professional traders. Traditional investors trade approximately once a month. Traditional investors are interested in long term investment. Traditional investors may have very little concern with speed of execution because traditional investors, intending to hold a stock for months or years, often are perfectly happy with any price in a stock's daily trading range.

Hyperactive investors are serious hobbyists or enthusiasts rather than professional investors. They do not earn their living exclusively from investing. They have other professions or occupations, but they are focally interested in the process of investing. Hyperactive investors trade approximately once daily, about twenty times more often than traditional investors. Hyperactive investors are often interested in popular stocks in which they may remain invested for relatively short periods of time, perhaps only a few days or hours. In addition, hyperactive investors, being the informed enthusiasts that they are, are increasingly aware of the high performance available to professional traders in automated systems for trading securities. Hyperactive investors therefore increasingly demand high speed of execution of orders for securities.

Professional traders are full-time, individual, professional securities traders, including so-called 'day traders.' Professional traders make as many as thirty to fifty trades a day, perhaps fifty times as many trades as hyperactive investors and a thousand times as many as traditional investors. Professional traders may account for as much as fifteen percent of the trading volume on Nasdaq. For professional traders, speed of execution is a matter of financial survival, crucially important. A delay in execution of even a few seconds can cause a loss for a professional trader because markets can change so quickly. When a professional trader enters an order, the order must be executed as quickly as possible.

One of the potential bottlenecks in systems for automated trading of securities is the data communications connections between broker-dealer systems and markets to which broker-dealer systems send orders for securities. Broker-dealer systems receive orders from customers, send the orders to markets, receive responses from markets, and communicate order status to customers. Orders are sent to markets through data communications paths that include a port at one terminus of the path and a market at the other. Responses are received from markets through paths. A market can be connected to a broker-dealer system through more than one port. If a path partially fails or is slowed for mechanical or electrical reasons, the broker-dealer system can be slowed. If a path fails completely, the broker-dealer system can be disabled with regard to the market served by that path.

To improve speed, flexibility, and reliability, broker-dealers add additional paths to their systems, so that more than one path is available from a broker-dealer to a particular market. Adding paths improves overall throughput of orders and responses to and from markets and reduces the risk of being completely disabled with respect to a market if a path fails. System performance can still vary widely, however, from the point of view of a customer whose order is sent through a path that is slowed or stopped by overload or mechanical failure.

The data communications systems in systems for automated trading of securities are typically assumed to demonstrate discrete failure of components or complete failure of entire subsystems. It is commonly assumed, for example, that if a path for communications fails, the path will fail completely. Paths can fail, however, in a gradual manner, degrading in performance until the path is practically useless despite not evidencing complete failure. Systems designed only to detect complete failure may do a poor job of detecting and administering gradual failures of components or subsystems.

Methods and systems are therefore needed for selecting paths dependent upon path availability, path performance, and optionally other qualities of paths, as well as detecting problems with paths, such as gradual deterioration of performance, so that other paths can be selected for sending order to markets when it would be helpful to do so in support of the overall quality of performance in broker-dealer systems.

SUMMARY

A first aspect of the invention is disclosed as a method of selecting, in a broker-dealer system for automated trading of securities, a path for sending an order for securities to a terminus market, in which the broker-dealer system includes at least one port. The port is coupled through at least one path to at least one terminus market, wherein each path includes at least one direct link between a port and a market system and optionally one or more additional links between the said market system and other market systems. Each path has a first terminus at a port and a second terminus at a terminus market, terminus markets being markets to which orders for securities are sent by the broker-dealer system.

This aspect of the invention in typical embodiments includes the steps of providing one or more path data structures representing one or more paths connecting the broker dealer system to one or more terminus markets. Each path data structure in typical embodiments includes data elements further comprising a port code, a terminus market code identifying the terminus market for the path, and one or more path selection data elements. This aspect of the invention in typical embodiments includes receiving an order comprising an order market code, and selecting, from the paths whose path data structures have terminus market codes with values equal to the value of the order market code, a path for the order dependent upon the values of the path selection data elements. In typical embodiments, one or more of the data elements comprising the path data structure uniquely identifies the path data structure, and at least one of the terminus markets is a terminus market in more than one path.

In a further embodiment, the port code and the terminus market code together uniquely identify the path represented by the path data structure. In a still further embodiment, providing at least one path data structure includes detecting changes in a status of the path and recording in the path data structure detected changes in the status of the path. In typical embodiments, recording changes in the status of the path comprises recording path status in at least one path status data element provided for that purpose in the path data structure representing the path. In a further example embodiment, recording changes in the status of the path comprises encoding path status into one or more of the path selection data elements.

A still further embodiment provides for detecting changes in the status of the path by making function calls to API routines, the API routines providing return values, and detecting return values that indicate whether a path is available for use in sending orders to a terminus market. In typical embodiments, receiving an order comprising an order market code includes receiving an order data structure comprising the order market code, a symbol, a side, a quantity, a time-in-force, and a price. In a further embodiment, the path data structure further comprises a connection code. In a still further embodiment, the connection code, the port code, and the terminus market code together uniquely identify the path represented by the path data structure. In some embodiments, the connection code further comprises a socket identification code.

In a further embodiment, one of the path selection data elements in the path data structure comprises a hop count. In embodiments utilizing hop count, selecting a path for the order typically includes comparing the hop counts of path data structures having terminus market codes equal to the order market code and selecting a path having a lowest hop count among paths represented by path data structures having terminus market codes equal to the order market code.

In a still further example embodiment, one or more of the path selection data elements comprises path latency. In embodiments utilizing path latency, selecting a path for the order typically includes also selecting, among the paths having path destination markets equal to the order destination market, a path having a lowest path latency. In embodiments utilizing path latency, selecting a path for the order often further comprises comparing path latencies among path data structures having terminus market codes equal to the order market code and selecting a path having a lowest path latency among paths represented by path data structures having terminus market codes equal to the order market code.

In many embodiments, one or more of the path selection data elements comprises a transaction cost for the path destination market. In embodiments using transaction cost, selecting a path for the order typically further comprises the steps of comparing transaction costs among path data structures having terminus market codes equal to the order market code, and selecting a path having a lowest transaction cost for the terminus market among paths represented by path data structures having terminus market codes equal to the order market code.

In other example embodiments, one or more of the path selection data elements comprises a combination code whose value is dependent upon the values of other path selection data elements. Among embodiments using combination codes, some embodiments implement combination codes as combinations of hop count, path latency, and transaction cost for the path terminus market. Among such embodiments, selecting a path for the order typically further comprises comparing the combination codes of path data structures having terminus market codes equal to the order market code and selecting a path having a lowest product of hop count multiplied by transaction cost further multiplied by path latency among paths represented by path data structures having terminus market codes equal to the order market code. In other embodiments using combination codes, selecting a path for the order typically further comprises comparing the combination codes of path data structures having terminus market codes equal to the order market code and selecting a path having a lowest sum of hop count plus transaction cost plus path latency among paths represented by path data structures having terminus market codes equal to the order market code.

A second aspect of the present invention is disclosed as a system for selecting from among multiple paths, in a broker-dealer system for automated trading of securities, a path for sending an order to a terminus market, in which the broker-dealer system includes at least one port, the port being coupled through at least one path to at least one terminus market. Each path typically includes at least one direct link between a port and a market system and optionally one or more additional links between the said market system and other market systems, each of the multiple paths having a first terminus at a port and a second terminus at a terminus market.

This aspect of the invention typically comprises at least one processor programmed to provide one or more path data structures representing one or more paths connecting the broker dealer system to one or more terminus markets. Path data structures typically include a port code, a terminus market code identifying the terminus market for the path, and one or more path selection data elements. Embodiments of this aspect typically include the processor programmed to receive an order comprising an order market code, and select, from the paths whose path data structures have terminus market codes with values equal to the value of the order market code, a path for the order dependent upon the values of the path selection data elements.

Embodiments of this aspect typically include at least one computer memory, the memory coupled to the processor, the processor being further programmed to store in the computer memory the path data structures. In typical embodiments, one or more data elements comprising the path data structure uniquely identifies the path represented by the path data structure, and at least one of the terminus markets is a terminus market in more than one path. In many embodiments, the port code and the terminus market code together uniquely identify the path represented by the path data structure.

In a further embodiment, the processor programmed to provide at least one path data structure further comprises the processor programmed to detect changes in a status of the path; and record in the path data structure detected changes in the status of the path. In additional typical embodiments, the processor programmed to record changes in the status of the path comprises the processor programmed to record path status in at least one path status data element provided for that purpose in the path data structure representing the path. In still further example embodiments, the processor programmed to record changes in the status of the path comprises the processor programmed to encode path status into one or more of the path selection data elements.

In additional example embodiments, the processor programmed to detect changes in the status of the path further comprises the processor programmed to make function calls to API routines, the API routines providing return values, and detect return values that indicate whether a path is available for use in sending orders for securities to a terminus market. In other example embodiments, the processor programmed to receive an order comprising an order market code further comprises the processor programmed to receive an electronic order message having an order data structure comprising the order market code, a symbol, a side, a quantity, a time-in-force, and a price. In still further embodiments, the path data structure further comprises a connection code. In many embodiments, the connection code, the port code, and the terminus market code together uniquely identify the path represented by the path data structure. In further embodiments, the connection code further comprises a socket identification code.

In many embodiments, one of the path selection data elements in the path data structure comprises a hop count. In embodiments using hop count, the processor programmed to select a path for the order typically further comprises the processor programmed to compare hop counts in path data structures having terminus market codes equal to the order market code and select a path having a lowest hop count among paths represented by path data structures having terminus market codes equal to the order market code.

In many embodiments, one or more of the path selection data elements comprises path latency. In embodiments that include path latency, the processor programmed to select a path for the order typically further comprises the processor programmed to compare path latencies in path data structures having terminus market codes equal to the order market code and select a path having a lowest path latency among paths represented by path data structures having terminus market codes equal to the order market code.

In many embodiments, one of the path selection data elements in the path data structure comprises a transaction cost for the terminus market identified in the path data structure. In embodiments that include transaction cost, the processor programmed to select a path for the order typically further comprises the processor programmed to compare transaction costs in path data structures having terminus market codes equal to the order market code, and select a path having a lowest transaction cost for its terminus market among paths represented by path data structures having terminus market codes equal to the order market code.

In many embodiments, one or more of the path selection data elements comprises a combination code further comprising a combination of hop count, path latency, and transaction cost for the path destination market. In many embodiments that include combination codes, the processor programmed to select a path for the order typically further comprises the processor programmed to compare the values of combination codes in path data structures having terminus market codes equal to the order market code and select a path having a lowest product of hop count multiplied by path latency further multiplied by transaction cost among paths represented by path data structures having terminus market codes equal to the order market code. In other example embodiments that include combination codes, the processor programmed to select a path for the order further comprises the processor programmed to compare the values of combination codes in path data structures having terminus market codes equal to the order market code, and select a path whose path selection data elements indicate a lowest sum of hop count plus path latency cost plus transaction cost among paths represented by path data structures having terminus market codes equal to the order market code.

Persons skilled in the art will recognize that the present invention's use of path latency to decide path selection is a form of Byzantine robustness. The idea of Byzantine robustness is taken from a famous problem in computer science known as the "Byzantine generals problem." A Byzantine failure comprises improper actions rather than a simple cessation of operation. Such failures can be caused by defective implementations, hardware faults, or even sabotage. No modem network provides Byzantine robustness within the network itself.

The statement made above, that no modem network provides Byzantine robustness, means, more specifically, that no modem network provides Byzantine robustness at the network, transport, data link, or physical layers of the network model. Software developers wishing to address Byzantine failures must do so by inventing their own solutions at the application level.

Error codes returned from calls to API routines typically indicate complete failure of a connection. By use of the present invention, it is possible to improve performance by selecting alternate routes based on path latency with no need to wait for a complete failure of a link. Path latency evaluation can indicate that it is desirable to improve performance by use of alternative routes when one or more paths to a terminus market are functioning poorly, despite the fact that all paths are still functioning without returning error codes from calls to API routines and without any other indication of complete failure of any path or link.

In addition to improving performance when one or more paths to a terminus are functioning poorly, path latency evaluation enables optimum tuning of the broker-dealer system for data communications performance even when all data communications links are performing normally. Path latency evaluation provides optimum tuning of otherwise normal functioning because path latency evaluation is capable not only of detecting poorly performing paths but also of detecting the best performing path even among several paths all of which are performing normally.

For a discussion of ways to design network protocols that are robust with respect to Byzantine failures, see Chapter 16 of *Interconnections, Second Edition: Bridges, Routers, Switches, and Internetworking Protocols*, by Radia Perlman (Addison-Wesley, Massachusetts 2000). For a description of the Byzantine generals problem, see L. Lamport, R. Shostak, and M. Pease, "The Byzantine Generals Problem," *ACM Transactions on Programming Languages and Systems* 4, no. 3 (July 1982): 382–401.

DRAWINGS

FIG. 1B illustrates path tables including path data structures.

FIG. 1C illustrates port configuration files including path data structures.

FIG. 1D illustrates alternative forms of port configuration files.

FIG. 14A illustrates alternative embodiments of path data structures for overrides.

DETAILED DESCRIPTION OF EXEMPLARY EMBODIMENTS

Figure 1:
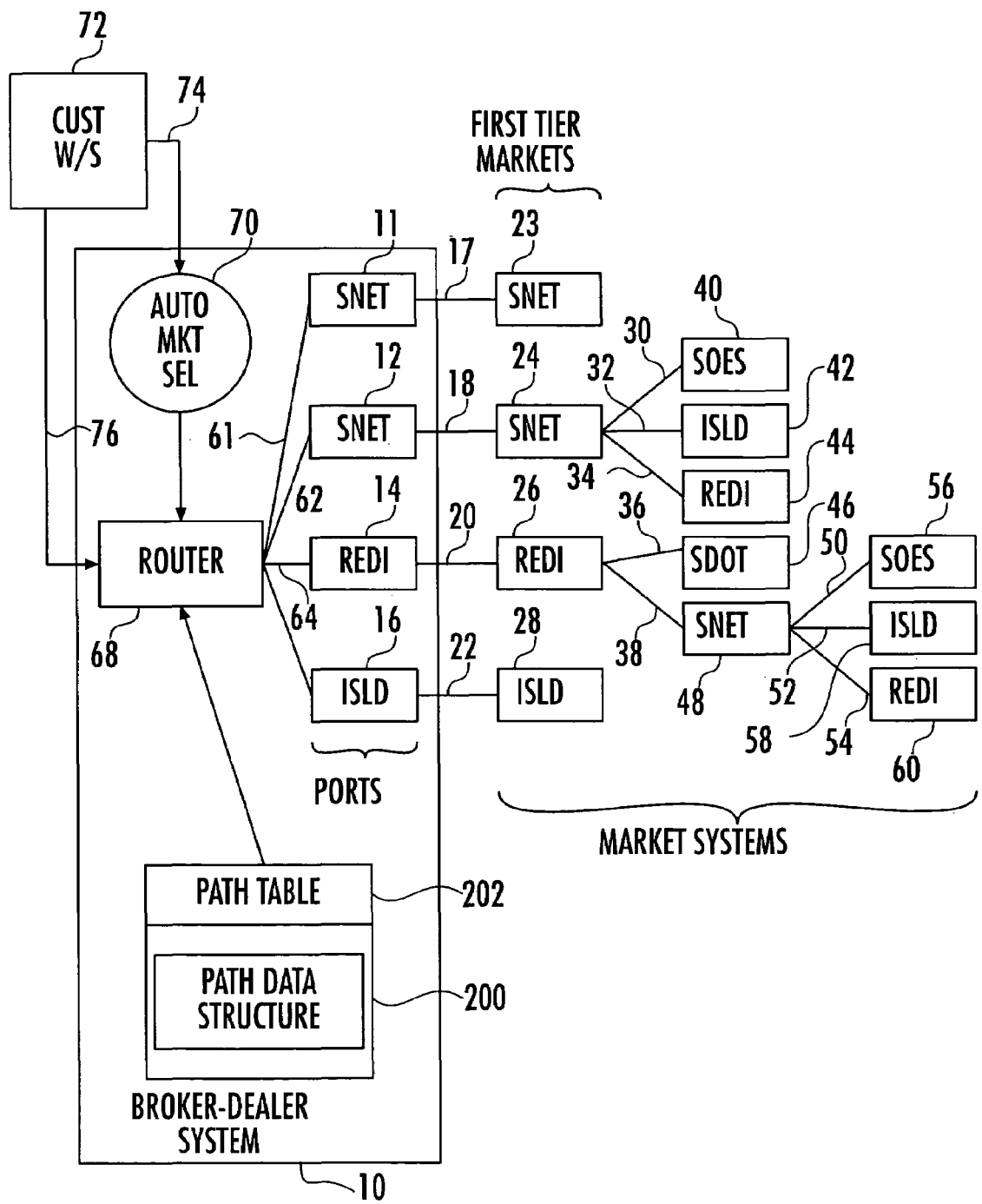
FIG. 1 is an overview of a broker-dealer system for automated securities trading.

Definitions:

"API" abbreviates 'application programming interface.' The APIs typically discussed in this specification comprise applications of process interfaces to network protocols for data communications, particularly transmission of orders for securities, responses to orders for securities, communication of path data structures among ports and routers, and path status update messages. Examples of APIs are Berkeley Sockets, Windows Sockets, and System V's Transport Layer Interface or "TLI." Examples of protocols are TCP/IP, IPX/SPX, and NSP.

"Code" is used in this specification to refer to data elements. The terms "data element" and "code" are used interchangeably. For example, a "port code" is a data element in a data structure used to identify a port, and a "terminus market code" is a data element used to identify a market to which an order is to be sent for execution.

"ECN" abbreviates "Electronic Communications Network," referring to an order matching service that provides market liquidity by matching orders for securities rather than by maintaining inventories of securities. In the context of the invention, ECNs are considered markets. In order to avoid confusion with data communications networks, ECNs are referred to as either "ECNs" or as "markets." ECNs typically have their own data communications protocols which must be followed by systems sending orders to ECNs. The ECNs' data communications protocols are public and well-known. Examples of ECNs, their names and MPIDs, are listed below.

EXAMPLE LIST OF ECNs

| MPID | Name |
|------|------|
| ARCA | Archipelago |
| ATTN | Attain |
| BRUT | Brass Securities |
| BTRD | Bloomberg Trade Book |
| INCA | Instinet |
| ISLD | Island |
| MWSE | Midwest Stock Exchange |
| NTRD | NexTrade |
| REDI | Speer Leeds |
| STRK | Strike |
| TNTO | Terranova |

"First-tier markets" are the markets to which ports in a broker dealer system are directly coupled or linked for purposes of data communications.

"Inside price" means, as appropriate, the highest bid price or the lowest ask price for a particular security. For buy orders, the inside price is the lowest ask price. For sell orders, the inside price is the highest bid price.

"Latency" means a measure of the speed with which markets respond to orders.

"Limit orders" are orders to be executed at the limit price or better. A limit price is the price stated with a limit order and included as part of the limit order. A limit order for a sale of securities is to be executed at or above the limit price for the order. A limit order for purchase of securities is to be executed at or below the limit price for the order.

"Link" means a direct data communications coupling between computers that are coupled for data communications through a network. Links exist typically between a router and a port, between a port and a first-tier market, and between markets that have between them no intervening connections to other markets. Links and data communications connections are sometimes referred to in this specification as couplings for data communications.

"Marketable" means orders for which the inside price is equal to or better than the order price. That is, Marketable buy orders have order prices equal to or higher than the inside ask price. Marketable sell orders have order prices equal to or lower than the inside bid price.

"Market," "electronic market," "market participant," "electronic market participant," "marketing network," and "electronic marketing network" are all used as synonyms for automated services accessible through electronic communications networks capable of executing electronic orders for securities by accepting from broker/dealers buy orders and sell orders, matching or failing to match buy orders with sell orders, and communicating the results to the broker/dealers. In this context, the term "automated services" is used to mean that markets comprise computers. Generally in this specification the term "market" is used to refer to "electronic markets," "market participants," "electronic market participants," "marketing networks," and "electronic marketing networks" or "ECNs." "Markets," as the term is used, are typically ECNs, market makers, exchanges, communications networks, or electronic securities marketing services designed and implemented to provide trading access to market makers or exchanges. Markets typically have names and symbols or MPIDs as described under the definitions of "ECN" and "market maker." The Nasdaq services SelectNet and SOES are treated as markets in this specification.

"Market maker" means a broker/dealer providing order matching and liquidity in a stock by maintaining an inventory of the stock traded through a national market. A list of example market makers, their symbols ("MPIDs") and names, is set forth below. Obviously the number and identity of market makers can change at any time.

EXAMPLE LIST OF MARKET MAKERS

| MPID | Name |
|------|------|
| BEST | Bear, Stearns & Co., Inc. |
| BTAB | Alex, Brown & Sons, Inc. |
| GSCO | Goldman, Sachs & Co. |
| HMQT | Hambrecht & Quist, LLC |

-continued

| MPID | Name |
|---|---|
| HRZG | Herzog, Heine, Geduld, Inc. |
| JANY | Janney Montgomery Scott, Inc. |
| LEHM | Lehman Brothers, Inc. |

"Memory" refers to any form of computer memory, volatile or non-volatile, including, for example, magnetic storage media such as hard disk drives, floppy disks, optical storage media, and random access memory.

"MPID" is a symbol used as a market participant identification, a code identifying market participants including ECNs and market makers.

"National market" means Nasdaq, the New York Stock Exchange, and the American Stock Exchange. SOES and SelectNet are national-level stock trading services or electronic securities marketing services provided through Nasdaq.

"Orders" are electronic orders for purchase or sale of securities. "Path" means a data communications path coupling a broker-dealer system to a terminus market, the path having at least one direct data communications link between a port within the broker-dealer system and a first market system, and having optionally one or more additional data communications links between the first market system and other market systems. Each path has a first terminus at a broker-dealer port and a second terminus at a terminus market. The terminus market is the market in the path in which orders using the path are to be executed. In paths comprising only one direct data communications link between a port and a first market system, the first market system in the terminus market, and such paths are said to have a hop count of one. In paths having one or more additional data communications links between a first market system and other market systems, one of the other market systems is the terminus market, and such paths have hop counts greater than one. Readers skilled in the art will notice that our definition of "path" is similar to the network-related concept of "route." The term "path" is used in this specification, however, partly to remind skilled readers that the "paths" of this specification are implementations of applications rather than network-level services.

"Path latency" means a measure of the speed with which a terminus market responds to orders and cancellations send to and from the terminus market over a path. Path latency in many embodiments of the invention is determined as the difference between the time when a response to an order is received through a path and the time when the corresponding order was sent to the terminus market through the same path. Path latency can be measured from normal orders or from test orders. Some markets support test orders as such. For markets in which test orders as such are not supported, test orders can be implemented by use of unmarketable orders immediately followed by cancellations. For markets receiving orders regularly, path latency can be tracked from normal orders, without the need for test orders. Path latency is implemented in some embodiments as single differences between two recorded times, sometimes referred to as "instant latencies." In some embodiments, path latency is implemented as various kinds of average latencies. Example methods and systems useful for calculating path latencies are described in this specification. Persons skilled in the art will recognize that there are many ways of calculating path latencies and that all of them are well within the scope of the present invention.

"Port" means a data communications server within a broker-dealer system. That is, a port is a computer programmed to provide, between a broker-dealer system and a market, electronic communications of orders for securities. A port administers data communications within a broker dealer system by use of the protocol used by the broker dealer system. A port administers data communications between the broker dealer system and a market by use of the protocol supported by the market. Each port is dedicated to direct communications with a single first-tier market. Within a broker-dealer system, however, for purposes of increasing data communications capacity with a particular market, more than one port may be coupled to the same market. In addition, although each port is coupled to only one market, it is possible for a port to operate as part of more than one path to more than one market when the single first-tier market to which the port is coupled provides the service of relaying orders to other markets. The markets to which ports in a broker dealer system are directly coupled are generally referred to as "first-tier markets."

"Processor" refers to the well-known component of any computer known as a central processing unit or "CPU." "Processor," as the term in used in this specification includes the plural as appropriates. That is, the term "processor" generally means "processor or processors," because many embodiments of the present invention utilize more than one physical processor to perform processing functions with a computer system. It is useful to remember in this regard, that all of the systems related to electronic marketing of securities, ECNs, market makers, electronic market systems such as the Nasdaq's SOES and Selectnet, NYSE's SuperDot, as well as all broker-dealer systems including ports, routers, and automated market selection systems, all of these systems, all of them, comprise computers and all of them include one or more processors.

"Response" refers to any data or message sent from a market in reply to an order. Responses include acknowledgements of receipt of orders, rejections of orders, cancellations of orders, and notifications of partial or complete executions of orders. "Router" means a computer programmed to receive an electronic order for securities, select a path to the market for which the order is intended, and send the order through the path to the market designated in the order. A router in typical embodiments is part of a broker-dealer system. An order for securities received in a router has as part of the order the identity of the market to which the order is to be sent, which, within the terminology of this specification, means that the market identified in the order is a terminus market in a path. The identity of the market to which the order is to be sent is entered in the order before the order arrives at the router, possibly by the customer originating the order or possibly by an automated market selection feature elsewhere in the broker-dealer system. Routers in typical embodiments of the invention are coupled for data communications to sources of electronic orders for securities. Routers in typical embodiments also are electronically coupled for data communications to ports. It is useful to note that in the data communications industry generally, the term 'router' is commonly used to refer to automated computing machinery and software that implement the third level, the network layer, of the traditional layered model for data communications networking. In this specification, however, the term "router" is used slightly differently, to refer to automated computing machinery and software function as an application, that is, part of an automated securities order processing system, residing typically in the seventh layer of the traditional layered model promulgated by the ISO, the International Standards Organization. In addition to the seven-layer ISO model, there is another simpler model suggested by W. Richard Stevens in Chapter 1 of his book, *UNIX Network Programming*, Prentice Hall (New Jersey: 1990). Mr. Stevens suggests combining the top three layers of the ISO model into one layer called the 'process layer,' and combining the bottom two layers into one layer called the 'data link' layer. In the four-layer model of Stevens, routers of this specification would be viewed as services residing in the top layer, the fourth layer, the so-called 'process layer.' The four-layer model makes it a bit clearer that calls to API routines effect an interface between layer four and layer three. That is, in the viewpoint of the four-layer model, software calls to API routines interface applications in the process layer with network services in the network layer of the model.

"SelectNet" is a Nasdaq electronic market system for indirect submission to market makers and to ECNs of electronic orders for stocks listed on Nasdaq. SelectNet implements orders broadcast to many markets or directed to particular selected markets. SelectNet orders for selected markets require MPIDs as parameters, the MPIDs being derived from quotes for the stock in the order. The operations of SelectNet are well-known.

"Side" refers to which side of the market is represented by an order or a quote. Side indicates whether the quote or order is to buy or sell, bid or ask. "Bid" indicates the buy side. "Ask" indicates the sell side. The present invention functions equally for either side of a transaction. Therefore we attempt to speak in neutral terms regarding side. We speak of execution rather than buying or selling. We use the term "price improvement" to indicate both price reductions for buy orders and price increases for sell orders.

"SOES" abbreviates "Small Order Execution System," a Nasdaq electronic market system for indirect submission to market makers of electronic orders for national stocks. Unlike SelectNet, SOES always operates by automatically selecting a market maker or ECN to receive an order. In contrast with SelectNet, therefore, SOES orders never require an MMID parameter. Like SelectNet, the details of SOES operations and procedures are public and well-known.

Detailed Description:

Turning to FIG. 1 a first aspect of the invention is seen, a method of selecting from among multiple paths a path for data communications in a broker-dealer system (10) for automated trading of securities. The illustrated example broker-dealer system includes at least one router (68), the router being coupled (64) for data communications to at least one port (14). The illustrated broker-dealer system includes at least one port (12), the port being coupled through at least one path (18, 30) to at least one market (40), wherein each path (18, 30) includes at least one direct link (18) between a port (12) and a first-tier market (24) and optionally one or more additional links (30, 32, 34) between the said first-tier market (24) and other markets (40, 42, 44), each of the multiple paths having a first terminus at a port (12) and a second terminus at a terminus market (40, 42, 44).

Figure 2A:
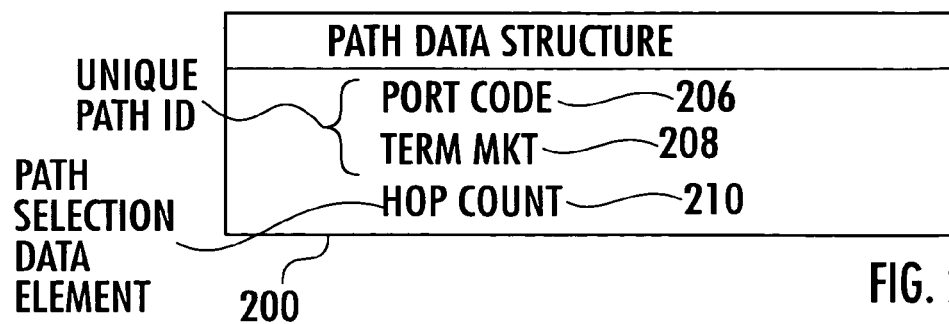
FIG. 2A illustrates an example path data structure useful with various embodiments of the invention.
Figure 2B:
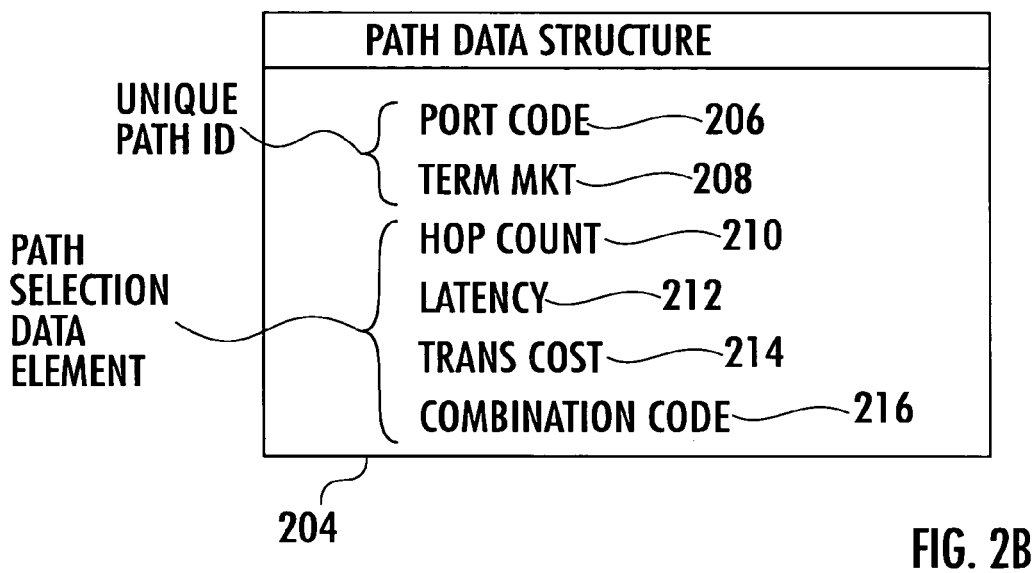
FIG. 2B illustrates an example path data structure useful with various embodiments of the invention.

An example embodiment illustrated in FIG. 1 includes providing one or more path data structures (200) representing one or more paths. FIGS. 2A and 2B show alternative example forms of path data structures useful in various embodiments of the invention. As shown in FIGS. 2A and 2B, each path data structure comprises path identification data elements, the path identification data elements in these examples further comprising a port code (206) identifying the port terminus of the path, and a terminus market code (208) identifying the terminus market of the path. Path data structures in typical embodiments include one or more path selection data elements. Path selection data elements, useful in typical embodiments of the invention, include hop count (210) as shown in the example embodiment of FIG. 2A and, as shown in the alternative example embodiment of FIG. 2B, hop count (210), path latency (212), transaction cost (214), and a combination code (216).

Figure 3:
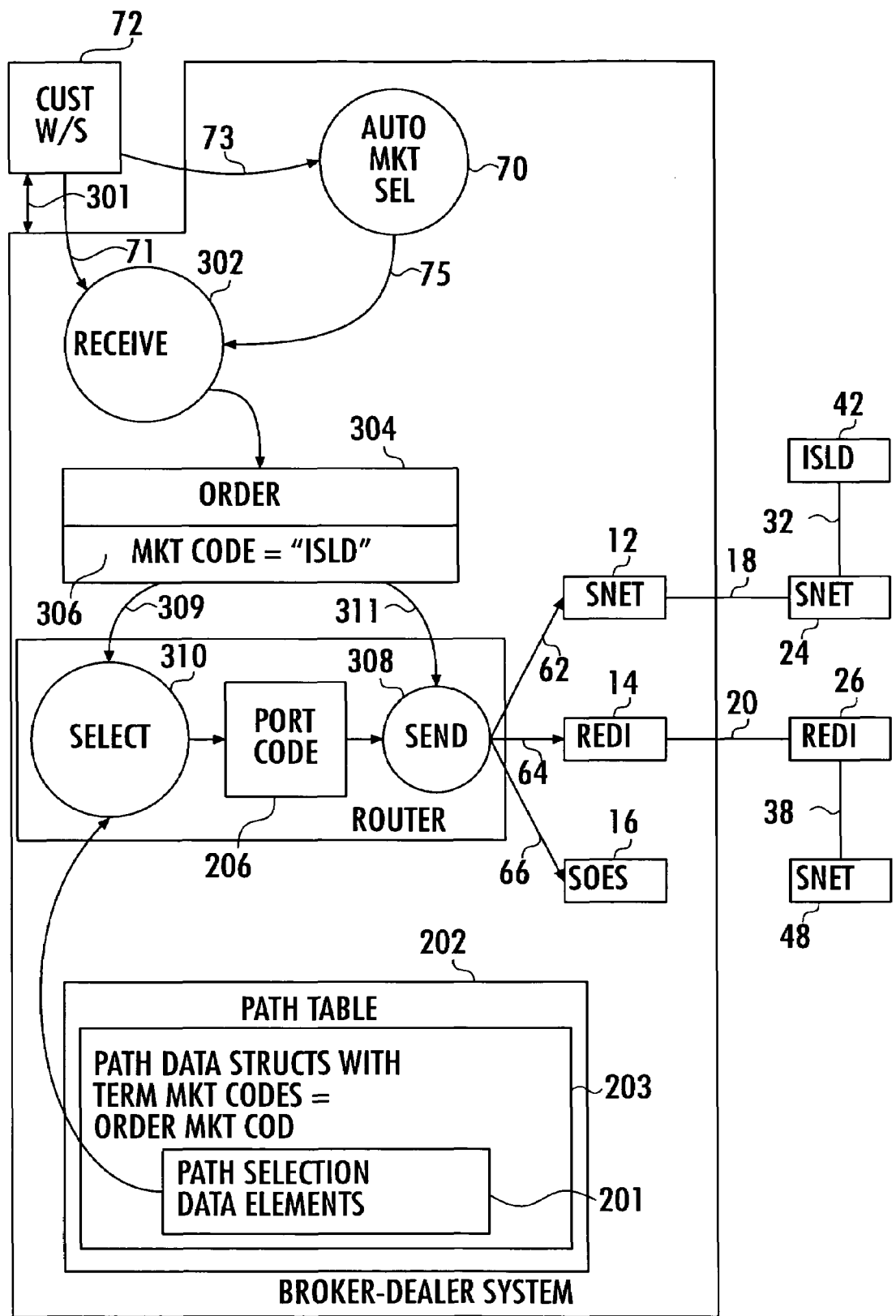
FIG. 3 illustrates selecting a path dependent upon path data structures having terminus market codes equal in value to the order market code.

A further embodiment illustrated in FIG. 3 includes receiving (302) from a customer workstation (72, 71) for delivery to a router (68) in a broker-dealer system (10) an order (304) comprising an order market code (306) wherein the order market was selected by the customer operating the customer workstation (72). A still further embodiment illustrated in FIG. 3 includes receiving the order (304) through an automated market selection process (70), the order including an order market code (306), wherein the order market code was set by the automated market selection process. That is, the automated market selection process selected the market to which the order is to be sent. For a discussion of automated market selection process, see U.S. patent application, Ser. No. 09/514,868 (now abandoned), a copy of which is set forth in Appendix I to this specification and incorporated by reference into this specification.

In various embodiments routers (68) receive (309) orders in various ways, all of which are well within the scope of the present invention. In some embodiments, for example, customer workstations (72) are in the same broker-dealer location with the broker-dealer system (10), coupled (301) for data communications to the broker-dealer system directly or through a local network, and such data communications couplings are used in such embodiments to send and receive orders. In other embodiments, a customer workstations are located remotely and communicate orders to broker-dealer systems through internets, extranets, or intranets. In still other embodiments, orders originate in other broker-dealer systems, in institutional computers, or in ECNs, to be sent to and received by routers. Routers in some embodiments are capable of selecting a terminus market for an order. Routers in many embodiments, however, do not select markets, the market codes in orders in such routers being already assigned a value by the time the orders reach a router.

A further embodiment shown in FIG. 3 includes selecting (310), from the paths whose path data structures have terminus market codes with values equal to the value of the order market code (203), a path for the order dependent upon values of path selection data elements (201).

In some embodiments, for example, the path identification data elements include a path identification code uniquely identifying a path. For embodiments in which a terminus market is a terminus market in more than one path, identification of a path is typically accomplished by identification of the path termini. Embodiments using a terminus market as a terminus market in more than one path and also using only a single path identification code, therefore, must algorithmically both encode and decode a port identification (as a first path terminus) and a terminus market identification (as a second path terminus) into the same path identification code. An example embodiment shown in FIG. 2A encodes path identification by designating a combination of a port code (206) and a terminus market code (208) in the path data structure (200) as a unique identification of a path (e.g., 12, 18, 24, 32, 42 on FIG. 3) represented by a path data structure (200). Various embodiments of the invention encode path identification in various ways, all of which are well within the scope of the invention.

Figure 4:
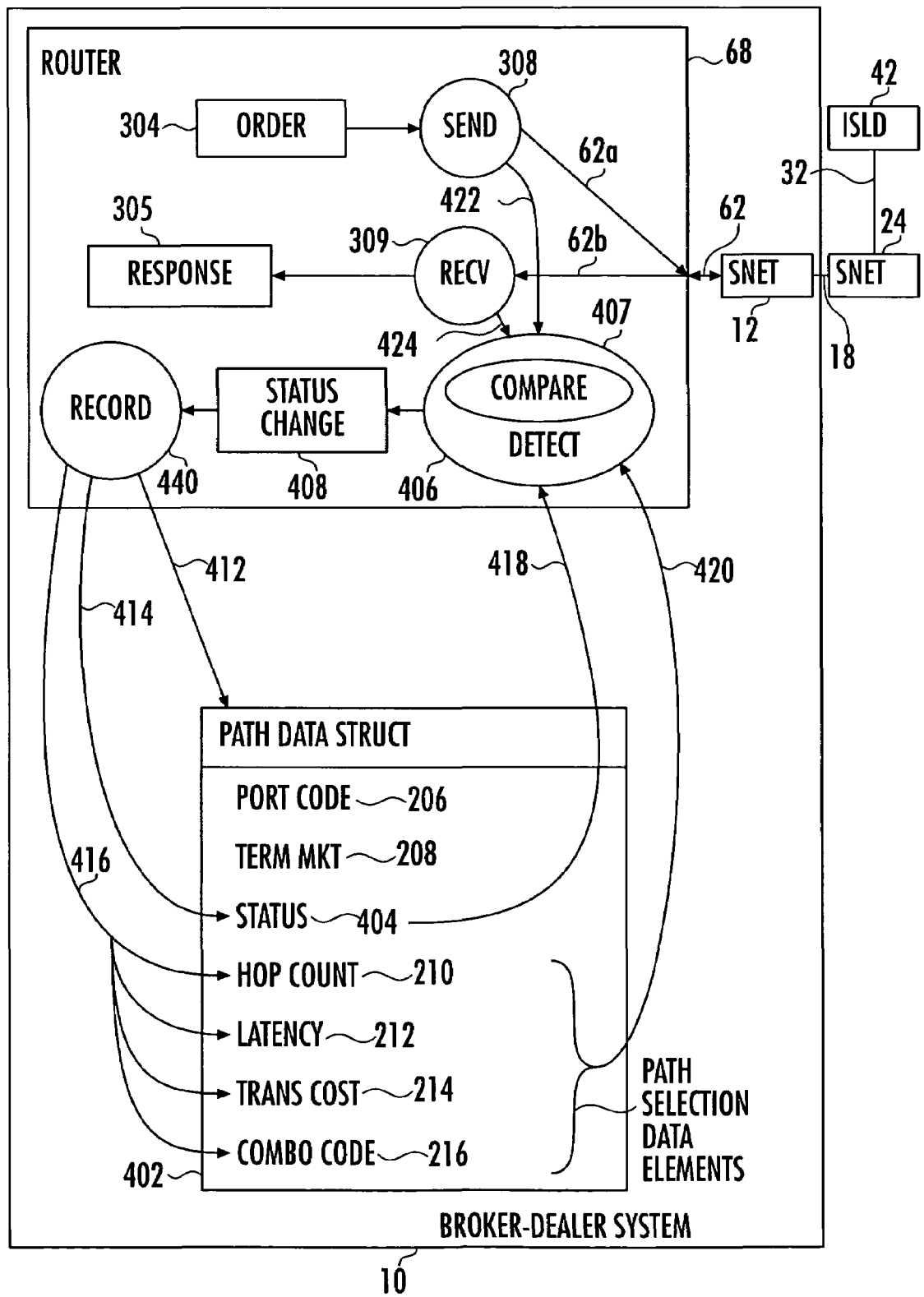
FIG. 4 illustrates detecting and recording changes in path status.

In a further embodiment, shown in FIG. 4, providing a path data structure includes detecting (406) changes (408) in a status of the path, the changes effecting a new status of the path, and recording (410, 412) in the path data structure (402) the new status of the path.

The illustrated embodiment includes recording the new status (414) of the path in at least one path status data element (404) provided for that purpose in the path data structure (402) representing the path (18, 32).

In a further embodiment shown in FIG. 4, recording changes (410) in the status of the path (18, 32) includes encoding the new status (416) into one or more of the path selection data elements (210, 212, 214, 216). Some embodiments, for example, encode path status by using a hop count (210) having a predetermined value such as zero to indicate that the path is not currently available. Other embodiments encode path status into a path selection data element by using a transaction cost (214) with a predetermined value such as zero to indicate that the path is not currently available. Other embodiments encode path status into a path selection data element by setting path latency (212) to a predetermined value to indicate that the path is not currently available. Other embodiments encode path status into a path selection data element by setting a combination code (216) to a predetermined value to indicate that the path is not currently available. Alternative embodiments use conventional or predetermined codes other than zero to indicate path status, all such conventions being well within the scope of the present invention.

It is traditional to model data communications networks in terms of layers. The well known reference model of the International Standard Organization (OSI), for example, defines seven layers including a physical layer plus layers known as data link, network, transport, session, presentation, and application. Communications across nodes within a layer are effected through "protocols." Communications between layers are effected through "interfaces." The pertinent interfaces for embodiments of the present invention are programming interfaces used for software applications to effect communications at the transport layer. Examples of such interfaces useful with the present invention are the application programming interfaces, or "APIs", known as Berkeley Sockets, AT&T's System V Transport Layer Interface, and Windows Sockets. The API model implemented in Berkeley Sockets is the de facto standard for network-oriented data communications APIs, especially for systems using the TCP/IP protocol suite, although modern sockets implementations will support other protocols in addition to TCP/IP. Both System V and Windows Sockets provide implementations or adaptations of APIs modeled on Berkeley Sockets. These three APIs are examples of well known APIs, and this specification describes example embodiments focused on the TCP/IP protocol suite and socket-oriented APIs. Persons skilled in the art will realize, however, that any API providing a programming interface to any functional network protocol is useful with the present invention. In addition, use of any network protocol compatible with APIs implemented in various embodiments is well within the scope of the present invention.

Examples of API routines are the well known socket routines named "send( )" and "recv( )." These functions provide return values indicating normal operations as well as errors. Error codes are capable of indicating, among other things, that a network subsystem has failed, that a connection must be reset because the API dropped it, that a socket is not connected, and that a socket has been shut down, any of which are treated by typical embodiments as meaning that the link to which the function call was addressed is not presently available. Error code values are treated in typical embodiments as indications of path status to be recorded in path data structures. That is, error code values are used to detect path status. More specifically, error code values are used in many embodiments to detect path status, and, by comparison with previously stored indications of path status, to detect changes in path status.

In a further example embodiment of the present invention, shown in FIG. 4, a send process (308) provides results of return codes (422, 424) to a detection process (406) that compares (407) the status shown in the return codes to the status (404) stored in the path data structure (402) and records (410) a new status (414) in the path data structure if the comparison shows a status change (408). The detection process functions similarly for return codes (424) from the receive process (309). A further embodiment shown in FIG. 4 provides the detection process comparing the return codes (422, 424) with status values encoded into one or more path selection data elements (210, 212, 214, 216).

Figure 4A:
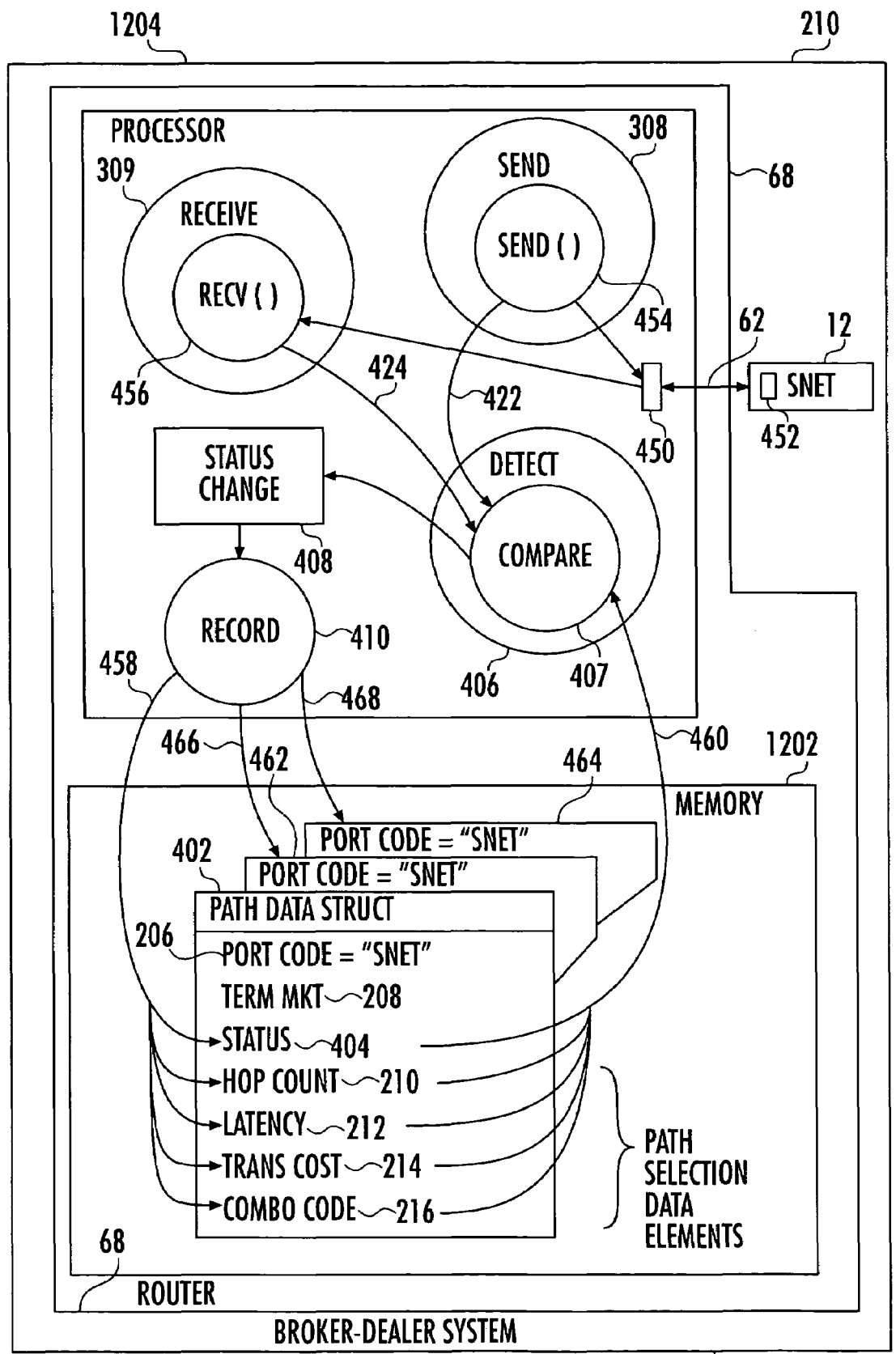
FIG. 4A illustrates the use of software calls to API routines in path status detection.

A more specific embodiment, shown in FIG. 4A, uses the socket-oriented API routines "send( )" and "recv( )" to implement the send (308) and receive (309) processes. The embodiment shown in FIG. 4A provides between the router (68) and the port (12) a network connection (62) that includes two sockets (450, 452), one at each end of the connection. Many embodiments effect the network connection by use of the most common protocol, TCP/IP. Other embodiments use other protocols for the network connection, including, for example, the Internet Packet Exchange/Sequenced Packet Exchange protocol suite often referred to as "IPX/SPX," DECnet's Network Services Protocol or "NSP," the AppleTalk protocols, and so on. Some modern APIs, such as Windows Sockets Version 2, support more than one network protocol.

The example embodiment illustrated in FIG. 4A implements its router's send process (308) by use of a socket-style "send( )" routine (454). The embodiment illustrated in FIG. 4A implements its router's receive process (309) by use of a socket-style "recv( )" routine (456). In the illustrated embodiment, the recv( ) routine and the send( ) routine provide their return error codes to a status detection process (406) that compares (407) the return codes to the existing status of the path. The path data structure (402) read for status will be a path data structure having a port code (206) equal in value to the port's identifier, in the illustrated example embodiment, "SNET."

Because in some embodiments path status is encoded in a separate status code (404) and in other embodiments path status is encoded in path selection data elements (210, 212, 214, 216), various embodiments read (460) for status comparison one or more of a status code and/or various path selection data elements. Because in typical embodiments a port serves as a terminus of more than one path, the record function (410) typically records (466, 468) status changes (408) in all path data structures (462, 464) having port codes with values equal to the port code for the port whose status is changed. The embodiment of FIG. 4A is shown with three such path data structures (402, 462, 464), although the present invention itself imposes no limit on the number of path data structures. Various embodiments have various numbers of path data structures with the same port code depending upon how many paths are served by a particular port.

Figure 5:
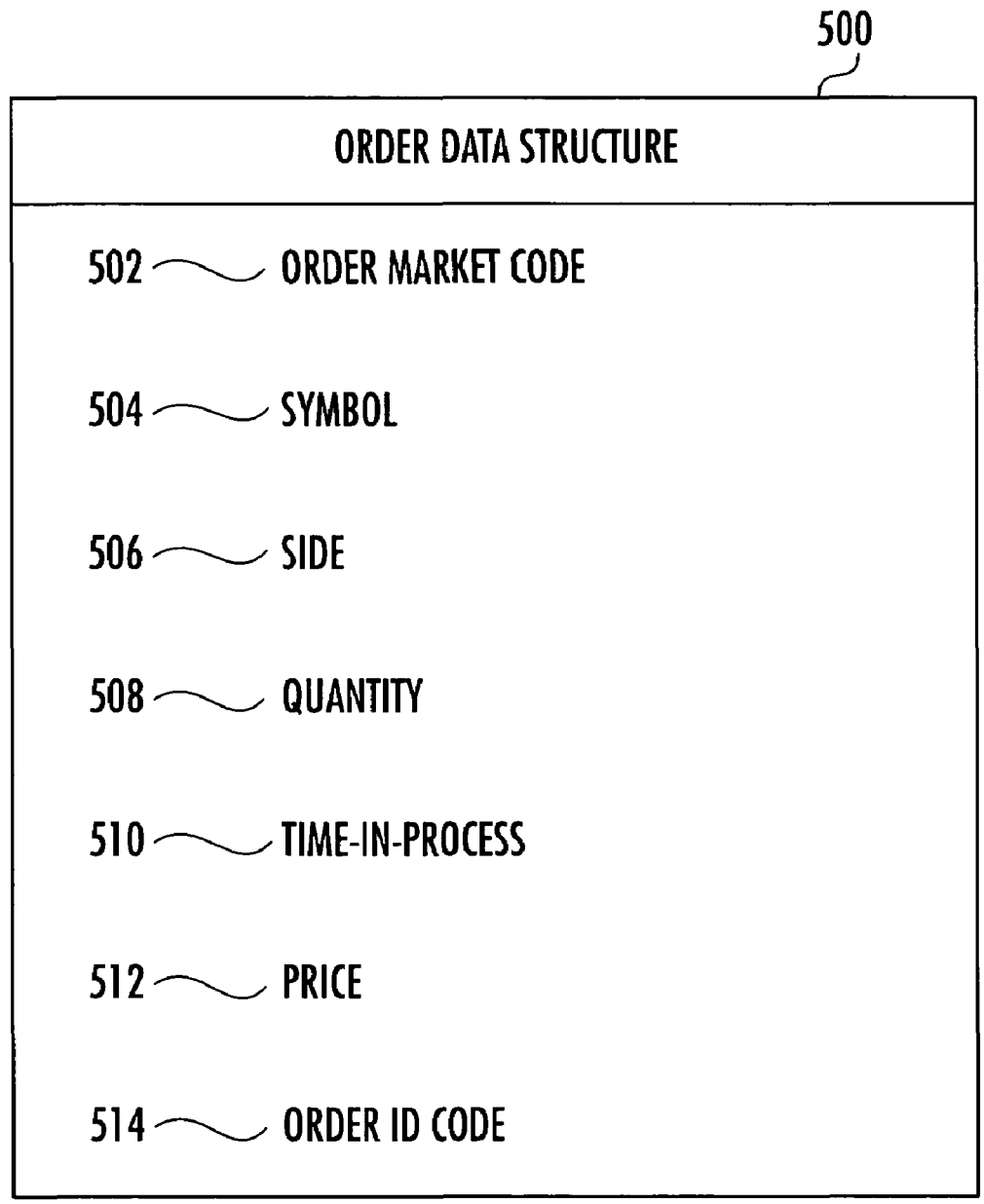
FIG. 5 illustrates a form of order data structure useful in various embodiments of the invention.

The further embodiment shown in FIG. 3 includes receiving an order (304) comprising an order market code (302). Receiving orders in typical embodiments includes receiving electronic order messages having order data structures. An order data structure (500) useful with the invention is shown at FIG. 5 to include an order market code (502) identifying the market to which the order is to be sent, a symbol (504) identifying the securities to be bought or sold, a side (506) indicating whether the securities are to be bought or sold, a quantity (508) of securities to be bought or sold according to the side, a time-in-force (510) identifying the period of time during which the order is to remain in effect, and a price (512) identifying a price for which the securities may be bought or sold according to the side. The price in typical embodiments is a limit price, that is, a price below which securities are not to be sold and above which securities are not to be purchased.

Figure 2C:
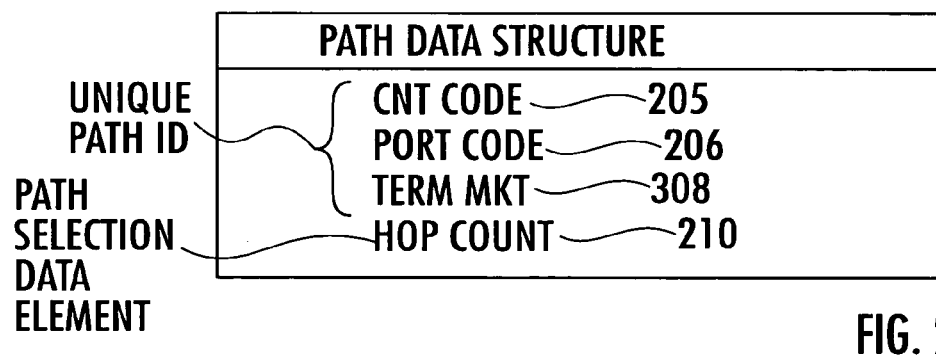
FIG. 2C illustrates an example path data structure useful with various embodiments of the invention.
Figure 2D:
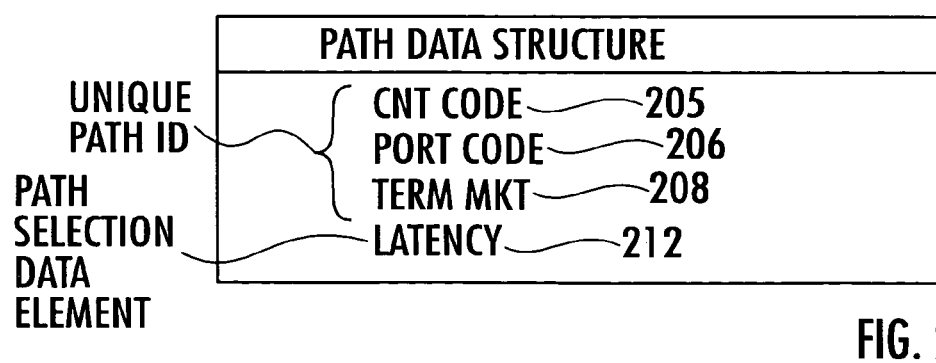
FIG. 2D illustrates an example path data structure useful with various embodiments of the invention.

Some embodiments implement path data structures that include a connection code (205) as shown in FIGS. 2C and 2D. In such embodiments, the connection code is useful in conjunction with other data elements such as, for example, the port code (206) and the terminus market code (208), to uniquely identify a path. The connection code can be assigned any value or values that serve to help identify a port or a path. Socket-oriented APIs typically provide unique identification codes for sockets created through calls to functions in the APIs, and the sockets so created are a standard model for network connections and network communications. In many embodiments using connection codes, therefore, the connection codes are implemented as socket identification codes. The use of socket identification codes as connection codes has the added advantage of programming convenience because programs that need the socket identification code for use in calls to API routines such as "send( )" or "recv( )" can read a socket identifier directly from a path data structure.

In a further embodiment shown on FIG. 1, each of several ports (12, 14, 16) are linked for direct data communications (18, 20, 22) each to only one market (24, 26, 28). The port code, therefore, identifies the one first-tier market to which a port is uniquely linked, and, in many embodiments, the port code is implemented as an MPID. That is, the MPID for the market to which the port is uniquely linked is used as the port code. In embodiments that use first-tier market MPIDs for port codes and in which a first-tier market is linked to the broker-dealer system through only one port, the path data structure representing a path is uniquely identified by the port code and the terminus market code taken together.

In a further embodiment, shown also on FIG. 1, a first-tier market (identified in the example as "SNET") (23,24) is connected to a broker-dealer system through more than one port. In this type of embodiment, the port code alone, when implemented as a first-tier market MPID, cannot uniquely identify a port because there is within the broker-dealer system (10) more than one port (11,12) with the same port identifier. In such embodiments, having more than one port with the same port identifier, that identifier being the MPID for the first-tier market to which more than one port is directly linked, the port code and the terminus market code taken together are insufficient to uniquely identify a path because there is more than one path for such systems having the same port code and the same terminus market code. Such systems typically use, therefore, both a connection identification and a port identifier or MPID to uniquely identify the broker-dealer terminus of a path. In some embodiments, three codes are used to uniquely identify a path: a connection code, a port code, and a terminus market code. In some embodiments, a connection code identifying a port regardless of the port code or the first-tier MPID and a terminus market code are used to uniquely identify a path. The connection code is a value identifying the connection returned from a call to an API routine establishing the connection between the router and a port. In many embodiments, the connection code is a socket identifier returned from a call to an API routine creating a socket.

Ports communicate with first-tier markets by use of communications protocols supported by the markets. The supported protocols vary from market to market. Some markets make available to broker-dealers and to other markets the service of relaying orders to other markets through links to the other markets. No protocols presently support automated reporting by markets at startup of markets' links to other markets, although it is possible in the future that protocols supported by markets may include the ability to notify broker-dealer systems of the available links to neighboring markets or to other markets. Although startup information for relay connections is not automatically provided by markets at startup in current art, the links for relaying orders from markets to other markets are published by the markets and are well known. After startup, during normal operations, path status, at least to the extent of whether a path is evidencing a complete failure of its link from a port to a first-tier market, in typical embodiments is inferred from return codes from calls to API routines.

Other aspects of path status during operations, such as less-than-complete failure, in typical embodiments are inferred from other variables such as path latency. Path data structures in some embodiments of the present invention, however, are initially created through direct data entry, typing on a keyboard by a human operator, of various values identifying and evaluating paths, such as, for example, port codes, terminus market codes, and, in some embodiments, hop counts, default latencies, or transaction costs. Despite the fact that markets may not report path availability at startup or upon initial connection to a port, embodiments of the invention implement the ability for ports to electronically communicate to routers at startup the paths supported by the ports.

Embodiments using connection codes often do not have the connection codes available for data entry when path data structures are created by data entry operators, because the connection codes in many embodiments are not created until data communications connections are established by software calls to API routines. Such embodiments will typically implement additional software routines to complete data entry of the path data structures, including scanning the incomplete path data structures created by data entry operators, making one or more calls to pertinent API routines needed to establish for each path data structure a connection between a router and a port identified in each path data structure, and recording in a path data structure a connection code returned from a pertinent API routine.

Figure 1A:
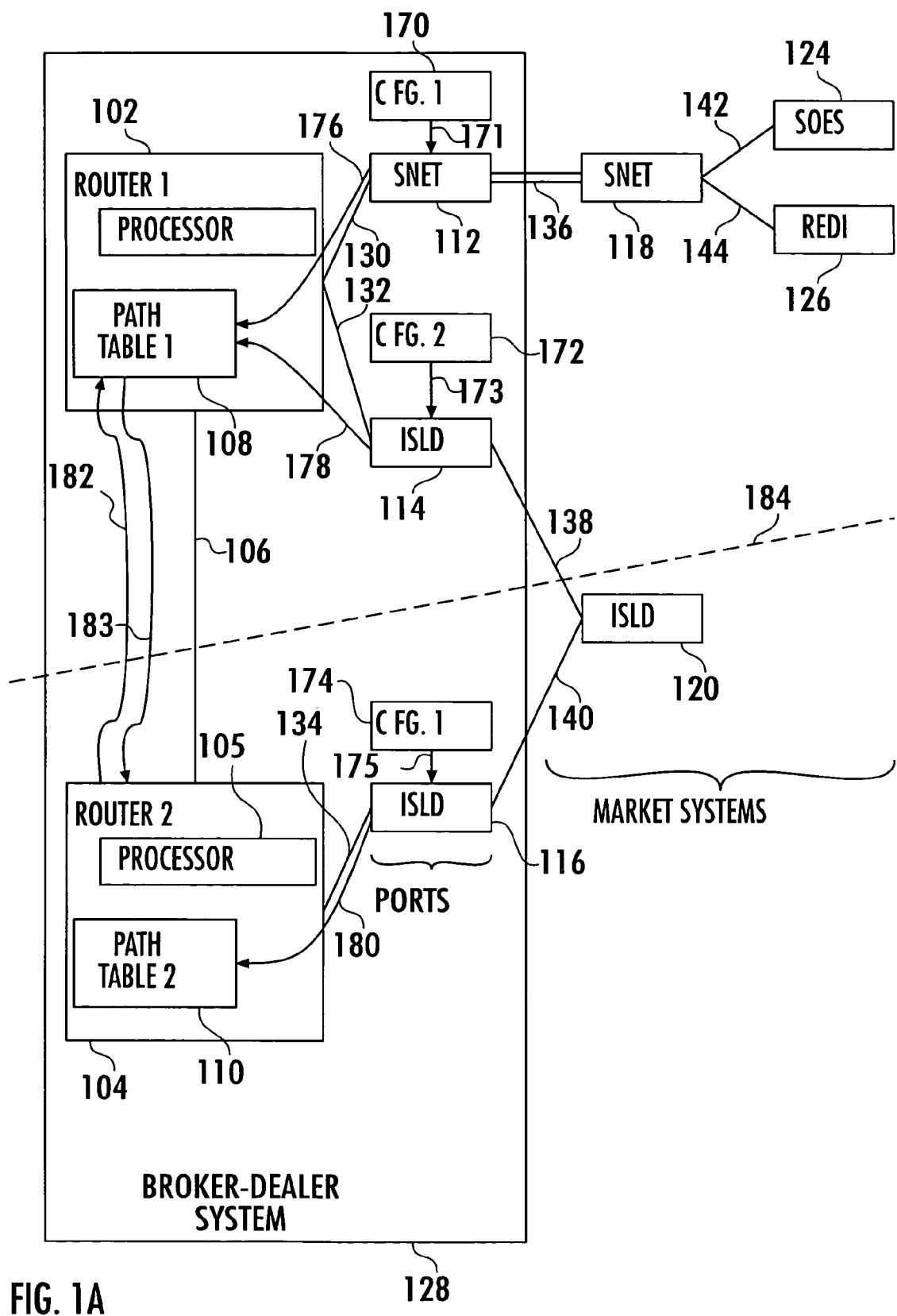
FIG. 1A illustrates startup processing with port configuration files.

Although markets in current art do not yet report path availability at startup or status changes during operations, some embodiments of the present invention include the ability for ports to report to routers at startup time the paths supported by the ports as well as changes in port status during operations. In FIG. 1A, for example, an embodiment is seen in which a router (102) includes a path table (108) comprised of path data structures (150, 152, 154, 156, 158 on FIG. 1B). The illustrated path data structures (150, 152, 154, 156, 158 on FIG. 1B) represent the paths implemented from Router 1 (102) through the ports having the port codes "SNET" (112) and "ISLD" (114) as shown on FIG. 1A.

Because the additional links (142, 144) available through SNET (118) to SOES (124) and REDI (126) are well known, the illustrated path data structures (150, 152, 154, 156, 158 on FIG. 1B) can be created by having a human operator use a terminal keyboard to type them directly into the path table (108).

An additional example embodiment illustrated also on FIG. 1A includes port configuration files (170, 172) in which are stored the path data structures illustrated in FIG. 1C. That is, the port configuration file Configuration File 1 (170) has stored in it the path data structures (152, 154, 156) representing the paths for which the "SNET" port (112) is a terminus, and the port configuration file Configuration File 2 (172) has stored in it the path data structure (150) representing the path for which the "ISLD" port (114) is a terminus. At startup, the "SNET" port (112) of the illustrated embodiment reads (171) the port configuration file (170) and communicates (176) the contents of the port configuration file to the router (102) served by the port for storage in the router's path table (108). Similarly, at startup, the "ISLD" port (114) in the illustrated embodiment reads (173) its port configuration file (172) and communicates (178) the contents of its port configuration file to the router (102) for storage in the path table (108). As a result of reading and storing in the path table (108) the contents of the configurations files (170, 172), the path table in the illustrated example embodiment, would include after this startup processing the four example path data structures (150, 152, 154, 156 on FIG. 1B) representing the paths for which the two illustrated ports (112, 114) are termini, that is, paths terminated by ports directly linked to Router 1 (102).

A further embodiment illustrated in FIG. 1A provides more than one router (102, 104) in the same broker-dealer system (128). In such embodiments, additional startup processing typically includes communicating (183) the contents of the path table (108) in a first router (102) to a second router (104), after the initial step of communicating the contents of the port configuration files (170, 172), which in the illustrated example would have the effect of storing in Path Table 2 (110) the path data structures identified with port codes designating Router 1 as the terminus port of the path represented by a path data structure (162, 164, 166, 168 on FIG. 1B). It is reasonable to depict a router as a "terminus port" in these circumstances because, just as ports typically implement the first link in a path between a router and a market, a router in multi-router embodiments sometimes implements the first link in a path from a second router to one or more markets.

In this example embodiment, the path data structures so communicated to Router 2 (104) have their hop counts incremented by one. That is, the path data structure representing the path from Router 1 to ISLD (172) has a hop count of 2 whereas its corresponding path data structure in Router 1 (150 on FIG. 1B) has a hop count of 1. The hop counts are increased in Path Table 2 so as to treat the connection from Router 1 to a port as a hop, whereas, for a path originating in a port to which Router 1 is directly connected, the connection from Router 1 to a port is not treated as a hop. Similarly, for paths for which Router 1 is treated as a terminus having a port code (162, 164, 166, 168 on FIG. 1B), the connection between Router 1 and Router 2 is not counted as a hop.

In such embodiments, in which path data structures are loaded at startup from port configuration files (170, 172, 174) coupled through ports (112, 114, 116), there is typically no need for human data entry of path data structures into path tables. In such embodiments, however, human operators typically do use terminal keyboards to type path data structures directly into the port configuration files (170, 172, 174) associated with the ports (112, 114, 116).

Although the illustrated example embodiment of FIG. 1A shows only two routers (102, 104) coupled (106) for data communications within a single broker-dealer system, other embodiments use more than two routers so coupled. The use of any practical number of routers is well within the scope of the present invention. In addition, although the two routers (102, 104) of the example embodiment shown in FIG. 1A are components of the same broker-dealer system, in other embodiments routers will be located in separate broker-dealer systems. This fact is illustrated in FIG. 1A by use of the reference line (184), illustrating division of broker-dealer system (128) into two separate broker-dealer systems (128a, 128b) in which routers (102, 104) located at arbitrary distances from one another are coupled (106) for data communications. Broker-dealers having routers coupled to ports coupled through paths to markets therefore use such embodiments to make paths available to other broker-dealers who do not themselves have available the same paths.

Making paths to markets available to broker-dealers who otherwise would not have them increases the number of orders available to markets, therefore increasing market liquidity. Making paths to markets available to broker-dealers who otherwise would not have them decreases pressure for all broker-dealers to support paths to all markets, resulting in reduced equipment costs to broker-dealers generally, resulting also in more efficient use of the equipment comprising routers and ports, and therefore also reducing the cost of providing services to securities traders and investors.

In the example embodiment under discussion, as shown in FIG. 1A, in which path data structures are loaded from port configuration files at startup, the path tables (108, 110) are created, not through direct data entry through a terminal keyboard by a person, but by data communications between ports and routers at startup. In addition to communicating the contents of port configuration files during startup communications, path tables in many such embodiments are updated from time to time during normal operations by use of status update messages from the ports (112, 114, 116) to the routers (102, 104).

Ports in most embodiments are computers having installed and running upon them data communications software that includes calls to API routines for purposes of communications with the first-tier market to which the port is linked. If a call to an API routine returns an error code indicating that a market link is lost, the port in such embodiments can in turn report that fact in a message to a router, and the router can then record in a path table data indications that the paths for which the port is a terminus are not available for sending orders. In embodiments in which a first router is connected to other routers using paths that include the failed market link, the first router can use status update messages to report the paths' unavailability to the other routers in turn. Some embodiments encode the fact that paths are not available in a status field, such as the one illustrated at reference (404) on FIG. 4. Other embodiments encode path unavailability by deleting from the path table the path data structures representing paths that have become unavailable. Other methods of encoding path unavailability may be used by other embodiments, all such methods being well within the scope of the present invention.

It is useful in many embodiments for ports at startup to have a way of identifying themselves. That is, a port intended to implement a data communications link to the ISLD ECN, for example, in some embodiments will determine that it is the ISLD port, or one of the ISLD ports, in the broker-dealer system in which it is located. Identification of the port may be effected for many purposes all of which are well within the scope of the invention and which include for example performing programmed checks on orders and responses to improve reliability of data communications and communicating to a router the identity of the port.

Another example of a useful purpose for a port to identify itself is the process of initial connection of a link to a router in a broker-dealer system in which the port code is to be associated with a connection identification or a socket identifier. Such embodiments are particularly useful in broker-dealer systems in which port codes are implemented as the MPIDs of first-tier markets and at least one first-tier market is linked to more than one port. The ports linked to such a market cannot be uniquely identified by the port code alone because in such embodiments (using MPIDs of first-tier markets as port codes) the port codes for all ports linked to the same first-tier market will have the same value. In embodiments of the kind in which more than one port is linked to a first-tier market, the port codes typically are implemented as MPIDs of first-tier markets, and a router therefore cannot uniquely identify a port by use of the port code alone, it is the router rather than the port that typically will record in a path data structure at least one additional code, such as, for example, a connection identification or a socket identifier, to aid in unique identification of a port. In other embodiments, a connection identification or a socket identifier may be recorded in a configuration file of a port, because, as persons skilled in the art will realize, at least in the case of socket-style connection-oriented communications, the socket identifiers for both sides of a connection or link are available to both sides of the connection.

One method useful within the present invention for a port to identify itself at startup is shown in FIG. 1C. In the example embodiment of FIG. 1C, the identification of a port is encoded in its port configuration file by the fact that the port code (151) is identical for all path data structures (152, 154, 156) in the port configuration file (170). Ports in such embodiments will read the port configuration file and communicate the path data structures in it to a router as described above. Ports in such embodiments often will store and retain in computer memory the value of the port code from the path data structures in the port configuration file for various uses, including, for example, use in identifying the port in its communications with routers.

An additional embodiment shown in FIG. 1D implements another method for a port to identify itself at startup. In the example embodiment of FIG. 1D, the path data structures (151, 152, 154, 156, 149, 150, 161, 160) have no port codes, and the identity of the port is encoded as the terminus market code in path data structures (151, 149, 161) having a hop count of zero. In such embodiments, a hop count having a predetermined value such as zero identifies a path data structure included in the port configuration file only for the purpose of identifying the port. In the example embodiment illustrated in FIG. 1D, the three path data structures (151, 149, 161) having hop counts of zero are included in the port configuration files (171, 173, 174) only to identify ports; these particular path data structures (151, 149, 161) are special purpose structures that do not represent actual paths as do the other path data structures shown in FIG. 1D. The example embodiment is illustrated with predetermined values of zero, but persons skilled in the art will realize that identification of such special purpose path data structures can be accomplished by use of any predetermined code value.

Ports in some embodiments using such path data structures, that is, special path data structures used to identify a port rather than a path, often before communicating the path data structures to routers (where they will be used to identify paths), will read from their port configuration files a path data structure having a hop count of zero, retain in computer memory the value of the port code stored in the terminus market code of that structure, discard that structure, read another path data structure from the port configuration file, add a port code to the new path data structure, and assign to the port code the value previously stored in computer memory. Ports in many such embodiments retain the value of the port code stored in computer memory for various uses, including, for example, use in identifying the port in its communications with routers.

Ports in other embodiments using such path data structures, that is, special path data structures used to identify a port rather than a path, typically will read from the port configuration file into computer memory a first path data structure, the first path data structure having a hop count of zero, the first path data structure having a terminus market code containing a port code value; read a second path data structure from the port configuration file; optionally add a port code to the new path data structure if it does not already have a port code; and assign to the port code in the second path data structure the port code value from the terminus market code in the first path data structure. Although, these steps will be accomplished in many embodiments before communicating the resulting path data structures to routers where they will be used to identify paths rather than ports, some embodiments simply send the entire port configuration file to the router and let the router sort out which path data structures indicate port identities. Persons skilled in the art will realize that all three alternative methods and structures for identifying ports just discussed, as practiced in various embodiments, as well as many other methods and structures for identifying ports, are all well within the scope of the present invention.

FIGS. 1C and 1D illustrate example embodiments of two methods for identifying ports upon startup. Other embodiments will use other methods of identifying ports upon startup, all of which are well within the scope of the present invention.

As mentioned above, the further embodiment shown in FIG. 3 includes selecting (310), from the paths whose path data structures have terminus market codes with values equal to the value of the order market code (203), a path for the order dependent upon values of path selection data elements (201). In many embodiments, path selection data elements include hop count. Hop count is the number of data communication links comprising a path represented by a path data structure. When functioning as the terminus market of a path, the first-tier markets coupled directly to ports form paths having hop counts of 1. Terminus markets not in the first-tier form paths having hop counts greater than 1.

FIGS. 2A, 2B, and 2C show examples of path data structures that include hop count and are useful with various embodiments of the present invention. The illustrated path selection data element in FIG. 2A is hop count (210). The illustrated path selection data elements in FIG. 2B are hop count (210), path latency (212), transaction cost (214), and a combination code (216). The illustrated path selection data element in FIG. 2C is hop count (210). The combination code (216) in FIG. 2B is used in various embodiments to encode a combination of at least two of the other path selection data elements, hop count, path latency, and transaction cost. The example embodiments described in this specification use data elements descriptive of path quality, hop count, path latency, and transaction cost, as path selection data elements. Additional embodiments use other path selection data elements. Any data elements descriptive of path quality used in various embodiments as path selection data elements are well within the scope of the present invention.

Figure 6:
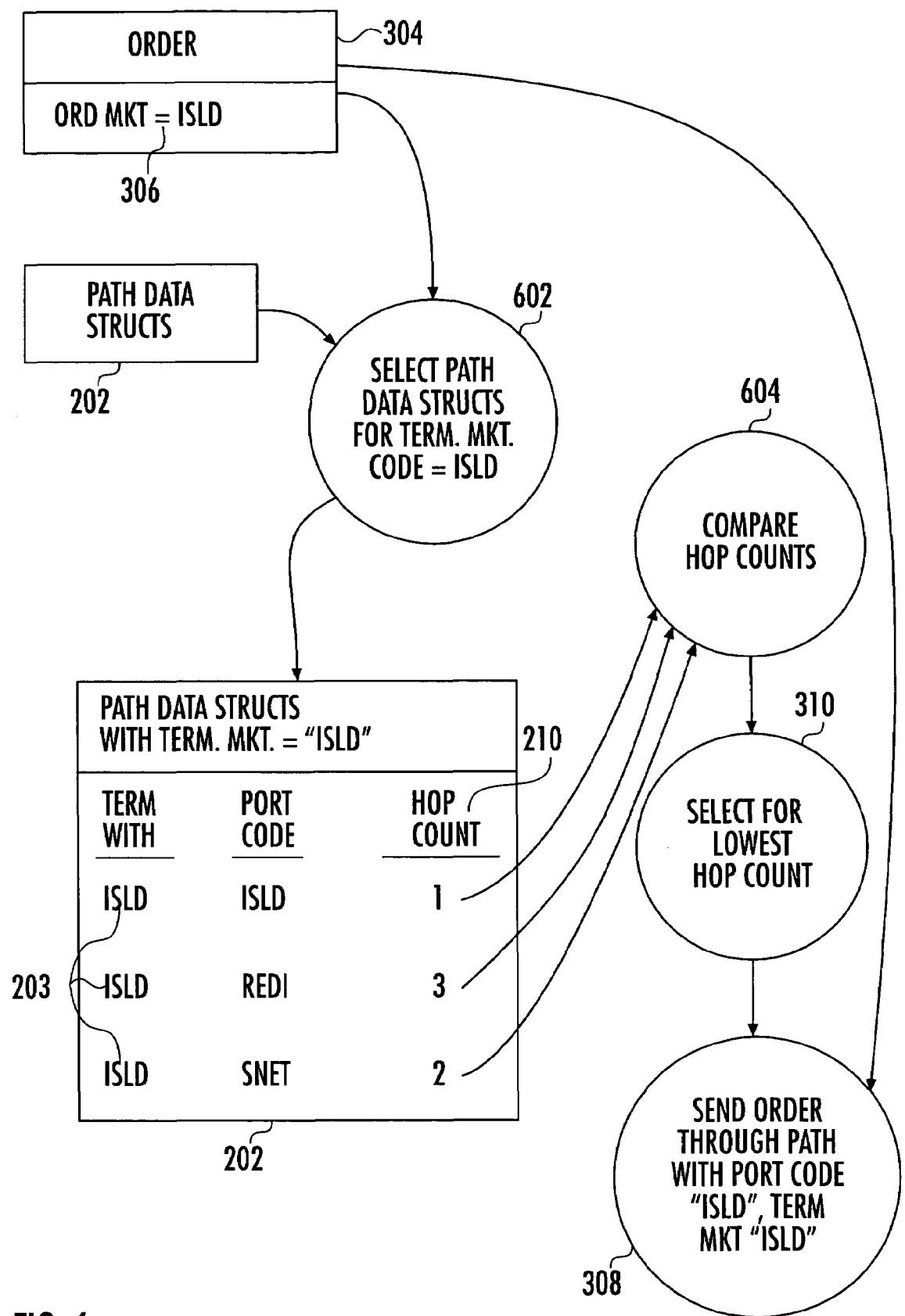
FIG. 6 illustrates the use of hop count to select a path for an order.

In a further embodiment shown in FIG. 6, selecting a path for the order includes comparing (604) hop counts among the paths (202) having in their path data structures terminus market codes (203) equal to the order market code (306), and selecting (310) the path represented by the path data structure having a lowest hop count. In the specific example embodiment illustrated in FIG. 6, the path selected has a hop count of 1, and the port code for the path selected is "ISLD." The terminus market for the path is the same as the order market, that is, "ISLD." The path selected for sending (308) the order, therefore, is the path having a port code of "ISLD" and a terminus market of "ISLD."

As mentioned above, the further embodiment shown in FIG. 3 includes selecting (310), from the paths whose path data structures have terminus market codes with values equal to the value of the order market code (203), a path for the order dependent upon values of path selection data elements (201). In many embodiments, path selection data elements include path latency. Path latency is a measure of the time elapsing between sending an order to a market and receiving from the market a response to the order. FIGS. 2B and 2D show examples of path data structures that include path latency (212) and are useful with various embodiments of the present invention.

Figure 7:
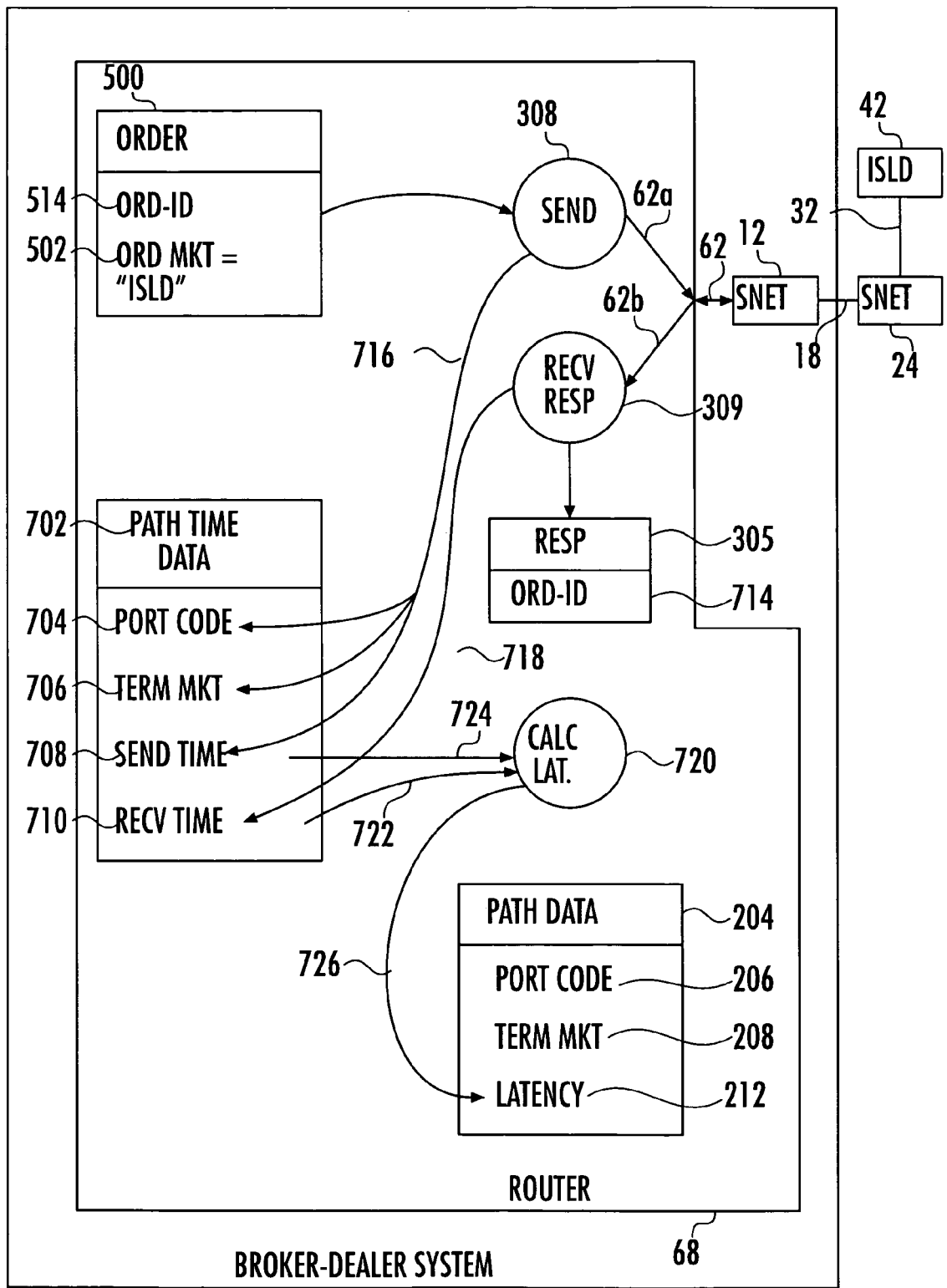
FIG. 7 illustrates path latency calculation.

Path latency is calculated in typical embodiments by subtracting from the time when a response is received from the terminus market the time when a corresponding order was sent from the broker-dealer system on a particular path to the terminus market. An example embodiment is seen in FIG. 7 in which an order for securities (500) has an order identification code (514) and an order market code (502), the order market code identifying the market to which the order is to be sent for execution. The send function (308) in the illustrated embodiment sends the order through the path including connections (18) and (32) to the market (42) identified by the order market code "ISLD". The send function in this example also records (716) in a path time data structure (702) the port code (704), the terminus market code (706), and the time when the order is sent (708), the "send time." The illustrated example embodiment uses a port code and a terminus market code to identify the path for which send time is stored. Readers skilled in the art, however, will realize that any data useful for identifying the path will be used in various embodiments, including, for example, a connection code in conjunction with a port code and a terminus market code. Any configuration of data sufficient to identify a path for which a path latency is to be calculated is well within the scope of the present invention.

Responses from markets include order identification codes for the orders to which the responses correspond. In the example embodiment shown in FIG. 7, when a response (305) to the order (500) is received, the receive function (309) records (718) the time when the response is received (710), the "receive time," in the path time data structure (702) for the path identified by the port code (704) and the terminus market code (706).

Figure 8:
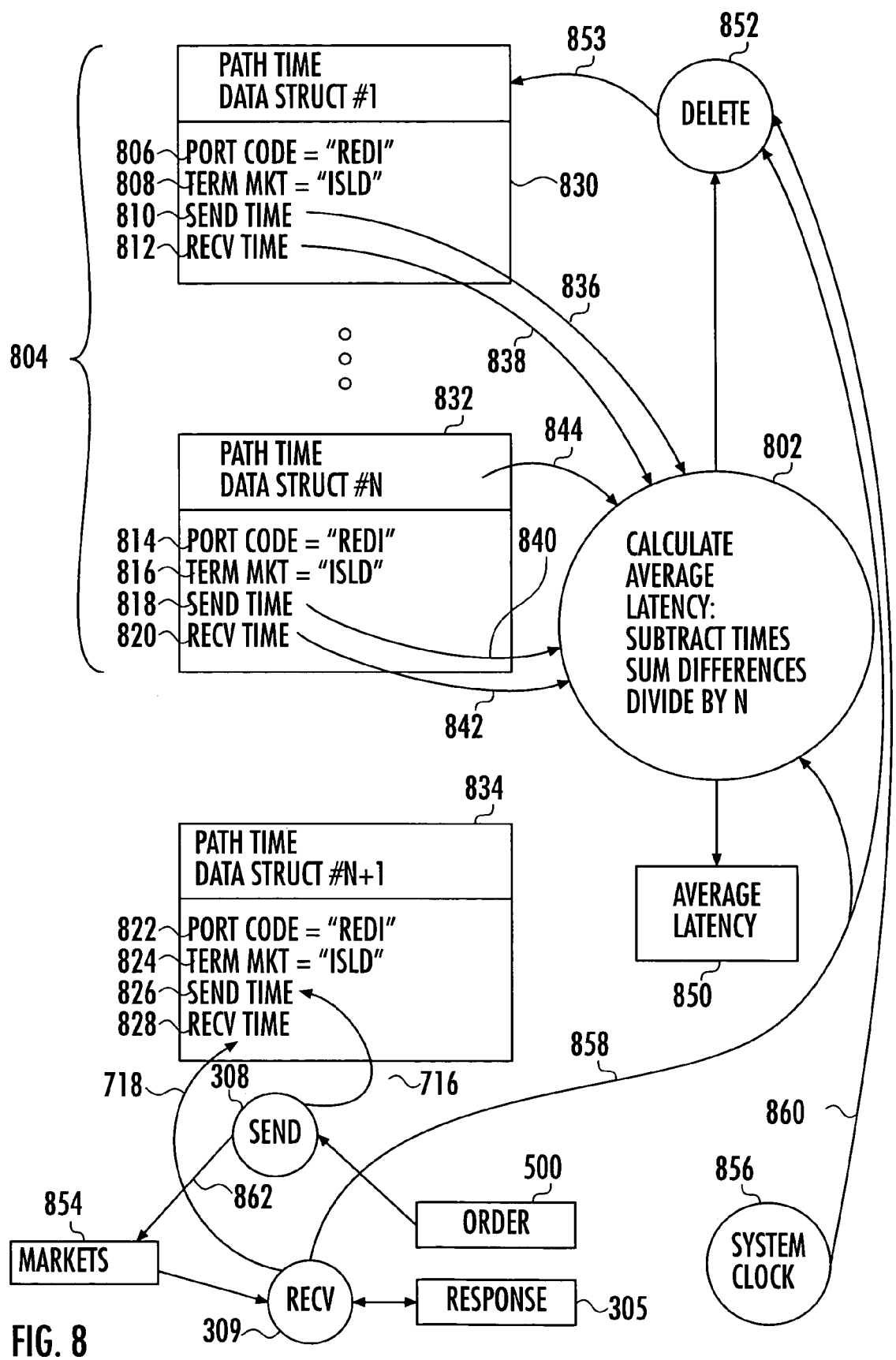
FIG. 8 illustrates average latency calculation.

In a further embodiment utilizing path latency, shown in FIG. 8, when the send function (308) sends (862) an order (500) to a market (854), the send function (308) also typically writes (716) the send time in a corresponding path time data structure (834). In such embodiments, the receive function (309) similarly typically writes receive times (718) when receiving responses (305) from markets (854). In embodiments utilizing average latencies, send times and receive times for a path are written in more than one path time data structure (830, 832, 834), as shown on FIG. 8, one path time data structure for each set of corresponding send and receive times for an order and a response to the same order. That is, for example, in path time data structure (834), the send time (826) is the send time for an order, and the receive time (828) is the receive time for a response to the same order. As shown in FIG. 8, embodiments using average latencies typically include more than one path time data structure for each path.

In the embodiment shown in FIG. 7, a calculation function (720) reads (722, 724) the send time (708) and receive time (710) from the path time data structure (702), calculates (720) a path latency, and stores (726) the calculated path latency (212) in the path data structure (204) identified by the port code (206) and the terminus market code (208). If the path latency (212) to be calculated is an instant latency, the calculation function will read only one set of send time and receive time. The example embodiment in FIG. 7 includes use of a single send time and a single receive time to calculate an instant latency.

In embodiments where the path latency to be calculated is an average latency, the calculation function typically reads more than one set of send times and receive times from more than one path time data structure having the same combination of port code and terminus market code. A further embodiment shown in FIG. 8 includes average latency calculations. The illustrated calculation function (802) calculates average latencies by reading send times (810, 818, 826) and receive times (812, 820, 828) from more than one path time data structure (830, 932, 834). In this kind of embodiment, the more than one path time data structures are all data structures for the same path, the path identified by the port codes (806, 814, 822), all of which have the same value, and by the terminus market codes (808, 816, 824), all of which have the same value. The calculation function (802) in the illustrated example calculates average latencies by subtracting the send times (810, 18, 826) from their corresponding receive times (812, 820, 828), summing the differences, and dividing the sum by N, where N is the number of path time data structures from which send times and receive times were read.

A new path time data structure typically is complete, ready for further processing, when it contains a receive time, because the send time typically is recorded first, when an order is sent to a terminus market. Then the receive time typically is recorded later, when a corresponding response is received in the broker-dealer system. The calculation of a path latency needs both a receive time and a send time to subtract.

Various embodiments provide different kinds of average latencies, although the use of any kind of average latency is well within the scope of the present invention. A further embodiment also shown in FIG. 8, illustrates a kind of average latency useful with the invention, a kind of average latency sometimes known as a decaying average. In this context, the term "decaying average" means an average in which the number of data structures from which times are read is maintained at a constant number by deleting the first data structure in the group when a new structure is created, that is, when new values of send time and receive time are written to a new path data structure having the same port code and the same terminus market code as the rest of the group. An example embodiment illustrated in FIG. 8 deletes (852) the first path time data structure in the group of more than one path time data structures from which times are read by the calculation function. As shown in FIG. 8 for the example embodiment under discussion, the receive function (309) notifies (858) the deletion function (852) and the average calculation function (802) when the receive time is written (718) in the (N+1)th path time data structure. The deletion function (852) then deletes (853) the first path time data structure in the pertinent group, the second path time data structure becomes the first, and the (N+1)th path time data structure becomes the Nth. In this way, the number of path time data structures in the group of path time data structures for the path identified by the port code and the terminus market code is maintained at N path time data structures, enabling calculation of the average of the N most recent instant latencies for that path.

In a further embodiment illustrated also in FIG. 8, the delete function (852) reads (860) a system clock (856) and periodically deletes all the path time data structures or alternatively deletes all the send times and delete times stored within the path time data structures. In embodiments using this method of deleting path time data structures, the number N of path time data structures containing useful send times and receive times for calculating average latencies is continuously increasing as long as orders are being sent to markets and responses to orders are received in the broker-dealer system. In such embodiments, an average latency calculated (850) represents the average of all the instant latencies for a path for send times and receive times recorded since the last deletion of all path time data structures, this being an average of the kind referred to as a "moving average."

Figure 9:
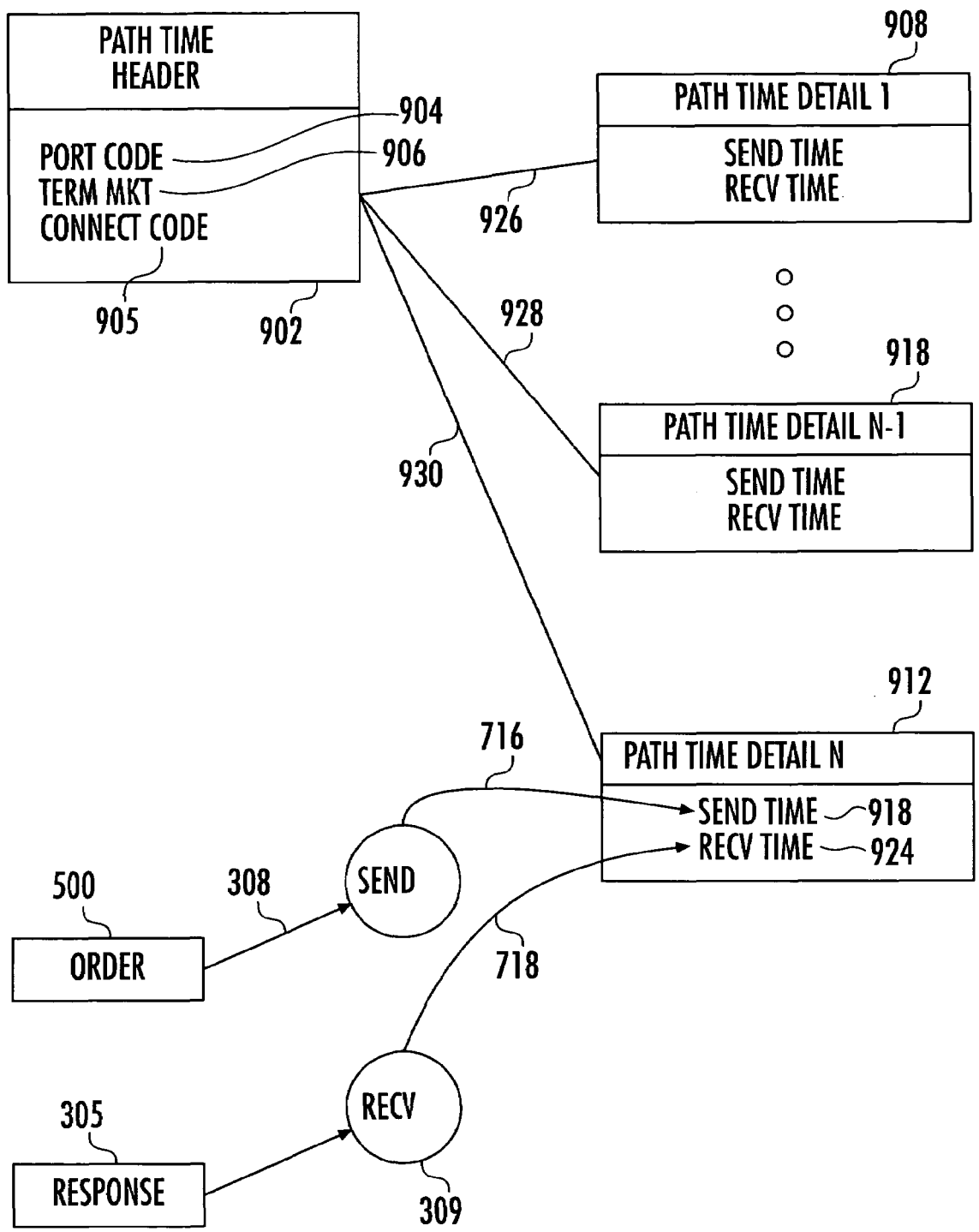
FIG. 9 illustrates a form of path time data storage useful with various embodiments of the invention.

Because in some embodiments the port code and the terminus market code taken together uniquely identify an order path, some embodiments using average latencies implement the path data structure with header structures and detail structures arranged in a one-to-many relationship as shown in FIG. 9. In the kind of embodiment shown in FIG. 9, one header structure (902) containing the port code (904) and the terminus market code (906) for more than one detail structure (908, 910, 912) each of which contains a send time (914, 916, 918) for an order and a receive time (920, 922, 924) for a response to the order. Similarly, for embodiments requiring connection codes in addition to port codes and terminus market codes, connection codes would be included in the header structure (902).

In a still further embodiment, illustrated in FIG. 9, detail data structures (908, 910, 912) are connected to a header data structure (902) for data processing purposes by use of memory pointers (926, 928, 930). The detailed data structures and their related header data structures taken together comprise of the information described above as being stored in path time data structures. Persons skilled in the art will realize that port codes, terminus market codes, send times, and receive times can be stored in many forms of data structure, all of which are well within the scope of the present invention. The use of memory pointers (926, 928, 930) in the embodiment shown in FIG. 9 means that the data structures illustrated in FIG. 9 are typically implemented in random access memory. Persons skilled in the art will realize, however, that port codes, terminus market codes, send times, and receive times can be stored in many forms of memory, all of which are well within the scope of the present invention.

Consider the embodiment shown in FIG. 1 in which three paths connect a broker-dealer system to the terminus market. Assume that the three paths have respectively hop counts of 1, 2, and 3, as shown in the path table (1002) in FIG. 10. Embodiments using hop count alone for path selection typically select the path with hop count=1, the smallest hop count, as the path for routing orders for the terminus market. Assume further that the three paths have respectively path latencies of 40.0, 3.0, and 0.15 seconds. Although it is counter-intuitive that the path with the lowest hop count would have a relatively high path latency, as a practical matter, this will sometimes be the case. Hop counts typically vary integrally, generally within approximately the same order of magnitude. Path latencies often vary among paths by several orders of magnitude, demonstrating values from a few milliseconds to hundreds of seconds. It is not uncommon for a path with a higher hop count to have a much smaller path latency than another path to the same terminus market with a lower hop count.

In the high-speed environment of securities trading, the path having the hop count of 1 and the path latency of 40.0 seconds is failing more disastrously than if calls to API routines to send orders through the path returned error messages indicating complete unavailability. The failure is more disastrous because embodiments selecting paths on hop count alone will select the path having hop count=1 and incur order fulfillment delays so great as to be unacceptable for trader customers needing high-speed responses during periods of active trading in fast moving markets. If the path having hop count=1 were to report complete failure through API function call return error codes, at least some other path would be selected, even in embodiments relying exclusively on hop count.

Selecting either of the other paths under discussion, the paths having path latencies of 3.0 and 0.15, will result in more or less normal operation at the application level. Selecting the path with hop count=3 and path latency of 0.15 seconds, however, results in noticeably better performance at the application level, especially for active traders in rapidly changing markets, despite the fact that the path with hop count=3 has the highest hop count among the candidate paths.

Whether to utilize path latency evaluation in particular embodiments is an engineering decision for each embodiment. Tracking the data elements needed to calculate path latencies, calculating the path latencies, and evaluating path latencies in path selection all represent at least some additional performance burden. Moreover, links having path latencies so bad as to represent disastrous failure may also soon show complete failure through error code returns from calls to API routines, thus removing such paths as candidates for selection even in embodiments relying exclusively on hop count for path selection, thus reducing the need, in some embodiments at least, to incur the additional computational burden of path latency calculations.

Whether the benefits of path latency calculations justify the associated additional burdens of programming and processing depends on the characteristics of particular embodiments. Traders interested in absolute best application performance in fast moving markets may create strong pressure to utilize path latency calculations in path selection. Embodiments in broker-dealer systems directed primarily to general investors and less active traders, however, might not need to track path latency. Investors seeking approximately a typical price for the day in a fairly inactive stock often do not care about near-instantaneous response times for orders. Embodiments implementing path latency as an element of path selection, however, will provide the benefits described in this specification.

Figure 10:
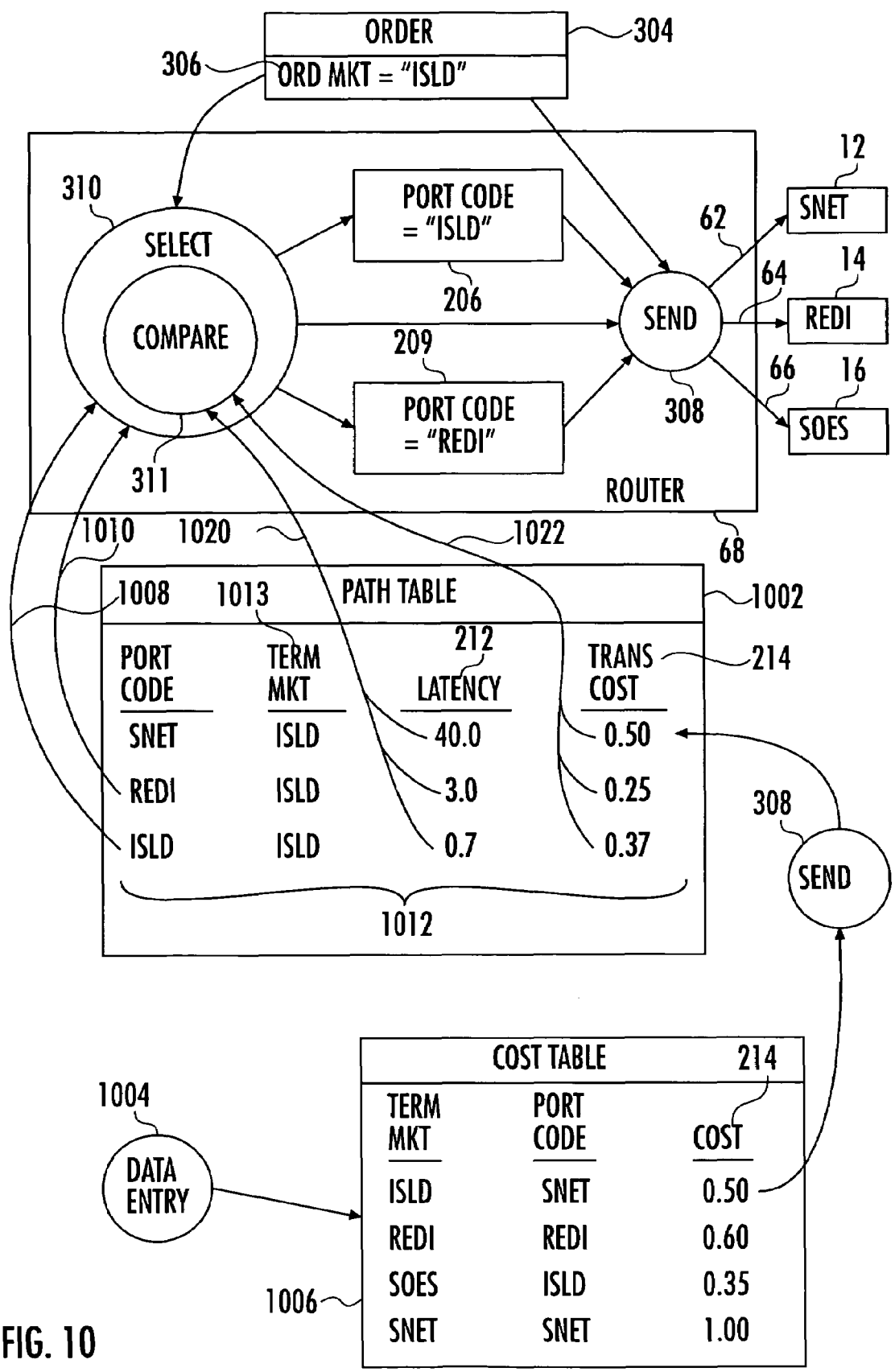
FIG. 10 illustrates the use of transaction cost in path selection.

A more detailed embodiment illustrated in FIG. 10 provides for the use of path latency to select a path. In the embodiment shown in FIG. 10, the order to be sent to a market is shown with its order market code set to "ISLD." The selection function (310) in the illustrated embodiment compares (1020, 311) the path latency values (212) and selects (1008) from among the paths (1012) having terminus market codes (1013) equal to the order market code (306), a path having the lowest path latency, which in the illustrated example is the path represented by the path data structure having a port code of "ISLD." The path data structures (1004) are shown in FIG. 10 embodied in a path table (1002). Persons skilled in the art will realize that there are many ways to embody the path data structures, including, for example, tables, arrays, and linked lists, with all of the many ways to embody path data structures being well within the scope of the present invention. Various embodiments implement path latencies as instant latencies, average latencies or both instant and average latencies.

As mentioned above, the further embodiment shown in FIG. 3 includes selecting (310), from the paths whose path data structures have terminus market codes with values equal to the value of the order market code (203), a path for the order dependent upon values of path selection data elements (201). In many embodiments, path selection data elements include transaction cost. Transaction cost is a measure of the financial cost of executing an order for purchase or sale of securities in a terminus market. FIG. 2B shows an example of a path data structure that includes transaction cost (214) and is useful with various embodiments of the present invention. In addition to the example in FIG. 2B, there are many way of implementing path data structures with transaction cost, all of which are well within the scope of the present invention.

Transaction costs may be characterized in various ways, including for example, as access fees or transaction fees. Transaction costs are statements of, or depend upon, well-known fees charged by markets for broker-dealers to buy and sell securities in the markets. Transaction costs in some cases are dependent upon various other factors including, for example, order type, order size, volume of orders purchased or sold by a broker-dealer or a customer), volumes of shares (purchased or sold by a broker-dealer or a customer), agreements among broker-dealers and markets or market makers regarding order flow, and other factors. There are many forms and kinds of transaction cost, all of which may be used within the scope of the present invention.

In a further embodiment, shown in FIG. 10, because transaction costs are well-known information available from markets and published by markets, transaction costs (214) are stored in a table (1006) created by simple data entry (1004), that is, typed into a computer file by a human operator using a keyboard and a data entry screen. In other embodiments, the transaction costs in reference tables such as table (1006) are created in an automated fashion by use of electronic files of cost data, or electronic cost message data, provided by markets.

In some embodiments of the kinds illustrated, the send function (308), in addition to creating path data structures and writing into the path data structures port codes, terminus market codes, send times, and receive times, also writes transaction costs as shown in FIG. 10. In a further example embodiment shown in FIG. 10, the selection function (310) programmed to select for lowest transaction cost, selects (1010) the path to ISLD, that is the path having terminus market="ISLD" and also having port code="REDI" (207).

In some embodiments, selecting (310) a path for an order includes comparing (311, 1022) the values of path selection data elements among the paths (1012) having in their path data structures terminus market codes equal to the order market code, and selecting the path whose path selection data elements indicate a lowest transaction cost (214) for the terminus market.

As mentioned above, the example embodiment shown in FIG. 3 includes selecting (310), from the paths whose path data structures have terminus market codes with values equal to the value of the order market code (203), a path for the order dependent upon values of path selection data elements (201). In many embodiments, path selection data elements include at least one combination code. A combination code is a path selection data element whose value depends upon some combination of the other path selection data elements, such as hop count, path latency, and transaction cost.

Figure 11:
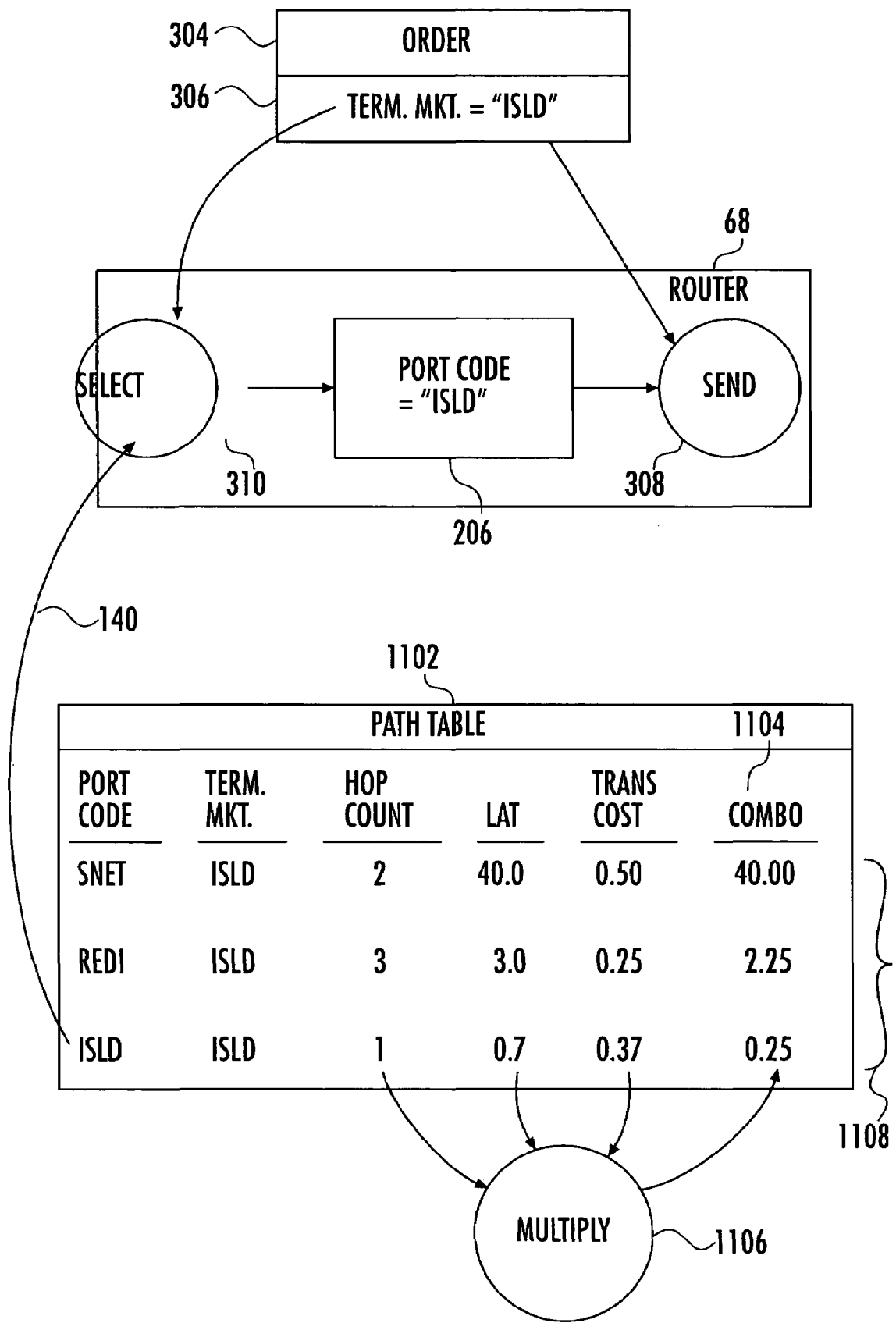
FIG. 11 illustrates the use of a combination code in path selection.

FIG. 2B shows an example of a path data structure that includes a combination code (216) and is useful with various embodiments of the present invention. In addition to the example in FIG. 2B, there are many way of implementing path data structures with combination codes, all of which are well within the scope of the present invention. A further example embodiment, shown in FIG. 11, provides for selecting paths by use of combination data elements whose values depend upon some combination of hop count, path latency, and transaction cost. In the specific embodiment shown in FIG. 11, the value of the combination element (1104) is established by multiplying (1106) hop count, path latency, and transaction cost for each path data structure (1108) in the path table (1102). In the illustrated embodiment, the selection function (310) selects (1110) the path represented by the path data structure having the lowest product of hop count multiplied by path latency further multiplied by transaction cost, that is, the path having its port code set to "ISLD." The path selected also has a terminus market code with the same value as the order market code in the order to be sent to market, that is, "ISLD." For clarity of presentation, the path table is shown with only three path data structures, all having the terminus market code "ISLD." Persons skilled in the art will realize that in typical embodiments, path tables contain many path data structures, and the terminus market codes in the path data structures do not all contain the same value.

For embodiments in which the status that a path is disabled is encoded by storing a hop count of zero, the multiplication method has the advantage of passing through to the combination code the indication that the path in question is disabled. The zero hop count when multiplied by other factors results in a zero value for the combination element (1104) which is then, in typical embodiments using such encoding, treated as an indication of complete path failure.

Although the embodiment illustrated in FIG. 11 effects combination values by use of multiplication of three path selection data elements, hop count, path latency, and transaction cost, persons skilled in the art will soon realize that many other ways of combining path selection data elements are useful with the present invention. Alternative embodiments, for example, create combination values by adding the values of other elements so that the combination value is a sum. Some embodiments, for example those intended to optimize speed, use path latency alone or in combination with hop count, ignoring transaction cost. Some embodiments optimized for cost effectiveness use transaction cost alone or in combination with hop count, ignoring path latency. There are many other useful combinations of path selection data elements all of which are well within the scope of the present invention.

Figure 14:
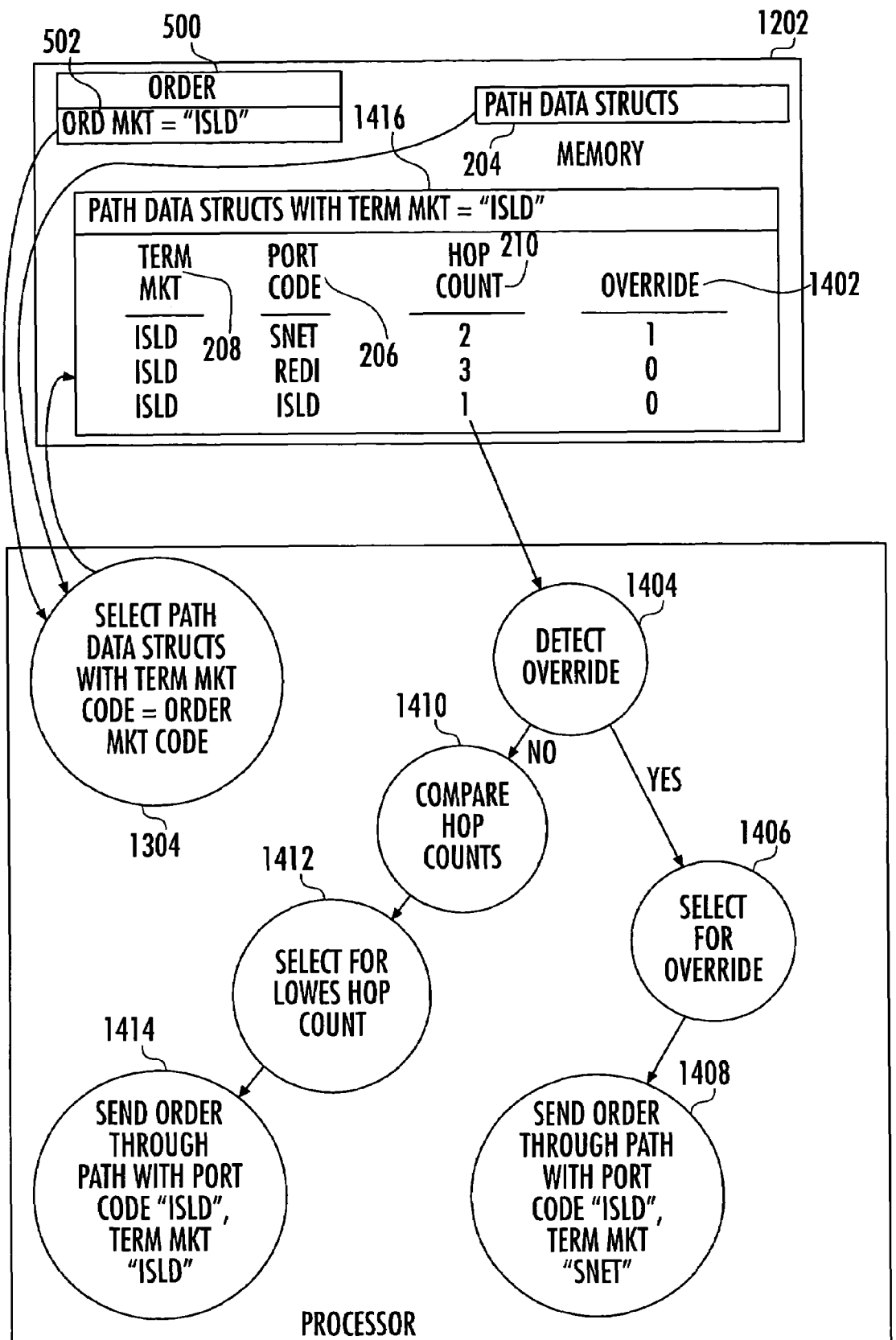
FIG. 14 illustrates an embodiment utilizing an override.

The additional example embodiment illustrated in FIG. 14 includes a form of path data structure having among its path selection data elements an override code (1402). An "override" is a designation of a path to be selected for sending orders regardless of the value of other path selection data elements in path data structures representing paths to the same terminus market. The embodiment shown in FIG. 14 includes selecting a path for the order by the further steps of detecting (1404) the presence of an override in the path selection data elements among path data structures having terminus market codes equal to the order market code (1416) and, if an override is detected, selecting (1406) the path having an override among paths represented by path data structures having terminus market codes equal to the order market code (1416). In the embodiment shown in FIG. 14, if no override is detected (1404), then the embodiment compares hop counts (1410) and selects (1412) a path having the lowest hop count among the paths having terminus market codes equal to the order market code (1416).

The only path selection data element, other than the override, used in the embodiment illustrated in FIG. 14 is hop count (210). Overrides, however, are used in other embodiments with other kinds of path selection data elements including for example path latency, transaction cost, and combination codes. In the embodiment shown in FIG. 14, an override is encoded as a "1" in a data element specifically designated as an override code (1402). In other embodiments the override is implemented as a boolean data element in which the "true" value indicates an override. In alternative embodiments, overrides are encoded in various path selection data elements.

In the alternative embodiments of path data structures illustrated in FIG. 14A, for example, an override is encoded as a "0" in a combination code (1418), as a "0" in a hop count (1420), and as a "0.00" in a path latency data element (1422). FIG. 14A also illustrates two example arrangements of path selection data elements. The second set of path data structures (1424) in FIG. 14A includes two path selection data elements, hop count and path latency. The other path selection data structures illustrated in FIG. 14A include only one path selection data element each, respectively, a combination code (1426) and a path latency (1428). Overrides, however are implemented in various embodiments with many arrangements of path selection data elements. There are many methods and structures for encoding overrides in path data structures, and all such methods and structures are well within the scope of the present invention.

Figure 12:
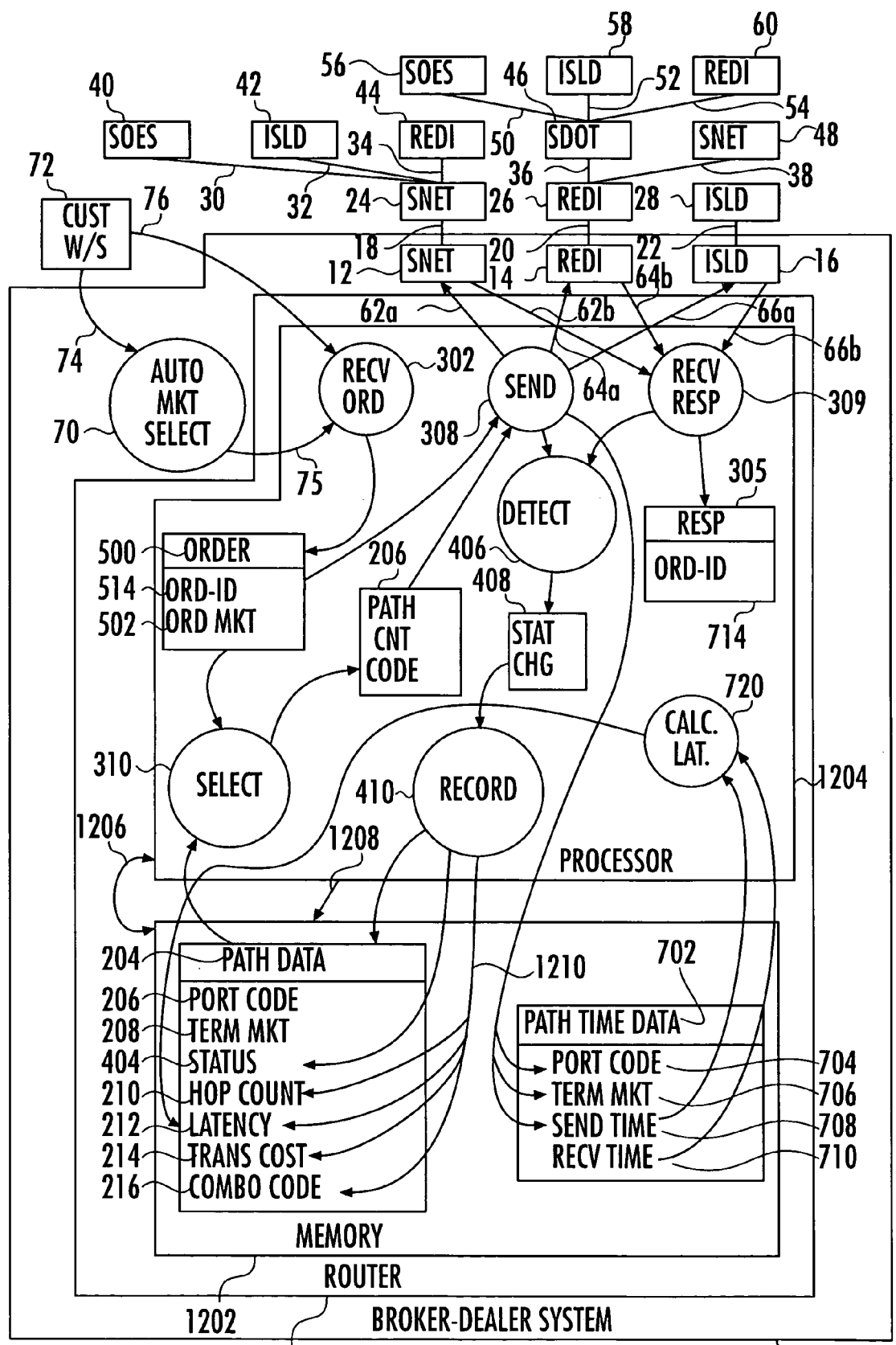
FIG. 12 illustrates a system for selecting paths for electronic orders for securities.

Turning now to FIG. 12, a further aspect of the invention is seen, a system for selecting from among multiple paths a path for sending an order for securities from a broker-dealer system for automated trading of securities to a terminus market. The illustrated example broker-dealer system includes at least one router (68), the router being coupled (64a, 64b) for data communications to at least one port (14). In typical embodiments, as shown in FIG. 12, the broker-dealer system includes one or more ports (12, 14, 16), the ports being coupled (18, 20, 22) through at least one path (18, 30) to at least one market system (24). Each path includes at least one direct link (18) between a port (12) and a first-tier market (24) and optionally also includes one or more additional links (30) between the said first-tier market and other markets, each path having a first terminus at a port (12) and a second terminus at a terminus market (40).

In typical embodiments as shown in FIG. 12, the router includes at least one processor (1204) programmed to provide at least one path data structure (204) representing a path, the path data structure comprising path identification data elements which in the illustrated embodiment further comprise a port code (206) identifying the port terminus of a path and a terminus market code (208) identifying the terminus market for the path. The path data structure (204) in the illustrated embodiment includes one or more path selection data elements (210, 212, 214, 216).

The additional links to other markets supported by first-tier markets are well known information published by the markets. A file composed of records similar to those illustrated in FIG. 2A, for example, including fields for a port code, terminus market code, and hop count, can be typed into a computer by a human operator using a word processor, a text editor, or a special data entry software routine developed for the purpose. A special data entry process is needed, for example, for embodiments that implement hop count as a numeric field as opposed to a text field. Any form of direct data entry for creation of path data structures, however, is well within the scope of the present invention.

A further embodiment shown in FIG. 12 includes the processor (1204) programmed to receive (302) an order (500) comprising an order market code (502) and further programmed to select (310), from the paths whose path data structures (204) have terminus market codes (208) with values equal to the value of the order market code (502), a path for the order dependent upon the values of the path selection data elements (210, 212, 214, 216). In some embodiments the port code (206) and the terminus market code (208) together uniquely identify the path represented by the path data structure (204), although embodiments having more than one port with the same port identifier typically utilize a connection code in addition to the port code and the terminus market code in order to uniquely identify a path. In many embodiments, connection codes are implemented as socket identification codes.

Other embodiments algorithmically encode and decode to and from a single data element sufficient information to identify a particular path. Algorithmic encoding is accomplished in such embodiments, for example, by combining a port code and a terminus market code into a single data element, for example, by concatenation. Still other embodiments combine a connection code (such as a socket identification) along with a port code and a terminus market code, all three into a single data element to identify a particular path. Persons skilled in the art will realize that there are many methods and structures functional for encoding path identification into a single data element, and all such methods and structures are well within the present invention.

The embodiment shown in FIG. 12 includes at least one computer memory (1202), the memory being coupled (1206) to the processor. In typical embodiments, as shown in FIG. 12, the processor (1204) is further programmed to store (1208) in memory (1202) the path data structures (204).

Typical embodiments of the present invention as shown in FIG. 4A include a processor programmed to provide path data structures (402, 462, 464) by detecting (406) changes in the status of a path, including, for example, whether the path is presently available for use, and recording (410) in the corresponding path data structure detected changes in the status of the path. Changes to be detected in path status include the availability of the link (62) between the router

(68) and the broker communications server (12), which changes are typically detected (406) by use of return codes (422, 424) from calls to API routines (454, 456).

A further embodiment illustrated in FIG. 12 provides a processor (1204) programmed to record (410) changes in the status of the path comprises the processor programmed to record path status in at least one path status data element (404) provided for that purpose in the path data structure (204) representing the path. A still further embodiment illustrated in FIG. 12 provides a processor (1204) programmed to record (410) changes in the status of the path by encoding (1210) path status into one or more of the path selection data elements. Some embodiments encode path status, for example, by using a hop count (210) of zero to indicate that the path is not currently available. Other embodiments encode path status into a path selection data element by using a transaction cost (214) of zero to indicate that the path is not currently available. Other embodiments encode path status into a path selection data element by setting path latency to zero to indicate that the path is not currently available. Other embodiments encode path status into a path selection data element by setting a combination code (216) to zero to indicate that the path represented by the path data structure is not currently available. There are many methods and systems for encoding path status, all of which are well within the scope of the present invention.

As mentioned above, in the more specific embodiment shown in FIG. 4A, the processor (1204) programmed to detect (406) changes in the status of the path includes the processor programmed to make calls to API routines (454, 456), the software functions providing return values, and detect (406) return values that indicate whether a path is available for use for data communications.

A further embodiment shown in FIG. 12 includes a processor (1204) programmed to receive (302) an order comprising an electronic order message having, as shown in FIG. 5, an order data structure (500) comprising an order market code (502), a symbol (504) identifying securities to be bought or sold, a side (506) indicating whether the securities are to be bought or sold, a quantity (508) of securities to be bought or sold according to the side, a time-in-force (510), and a price (512).

Although markets in current art do not yet report path availability at startup or status changes during operations, many embodiments of the present invention include the ability for ports to report to routers at startup time the paths supported by the ports as well as changes in port status during operations. Earlier in this specification, we used FIGS. 1A, 1B, and 1C to illustrated method aspects of the invention. Now we turn again to those drawings to illustrate some of the system aspects of the invention.

In FIG. 1A, an example embodiment is seen in which a router (102) includes a path table (108) comprised of path data structures (150, 152, 154, 156, 158 on FIG. 1B). The illustrated path data structures (150, 152, 154, 156, 158 on FIG. 1B) represent the paths implemented from Router 1 (102) through the ports having the port codes "SNET" (112) and "ISLD" (114) as shown on FIG. 1A. Because the additional links (142, 144) available through SNET (118) to SOES (124) and REDI (126) are well known, the illustrated path data structures (150, 152, 154, 156, 158 on FIG. 1B) can be created by having a human operator sit down a terminal keyboard and type them directly into the path table (108). That is, here is one way of creating in a router in a system path data structures representing known paths: just type them in. Now we turn our attention to another way of creating path data structures as elements of a router in a system.

An additional example embodiment illustrated also on FIG. 1A includes port configuration files (170, 172) in which are stored the path data structures illustrated in FIG. 1C. That is, the port configuration file Configuration File 1 (170) has stored in it the path data structures (152, 154, 156) representing the paths for which the "SNET" port (112) is a terminus, and the port configuration file Configuration File 2 (172) has stored in it the path data structure (150) representing the path for which the "ISLD" port (114) is a terminus. The "SNET" port (112) of the illustrated embodiment includes a processor programmed to read (171) upon startup the port configuration file (170) and communicate (176) the contents of the port configuration file to the router (102) served by the port. The router (102) in turn includes a processor (103) programmed to store in the router's path table (108) the port configuration file received from the port (112).

Similarly the "ISLD" port (114) in the illustrated embodiment includes a processor programmed to read (173) its port configuration file (172) and communicate (178) the contents of its port configuration file to the router (102). The router (102) for the ISLD port (114) includes a processor (105) programmed to store in the path table (108) the communicated port configuration file. As a result of reading and storing in the path table (108) the contents of the configurations files (170, 172), the path table in the illustrated example embodiment, would include after this startup processing the four example path data structures (150, 152, 154, 156 on FIG. 1B) representing the paths for which the two illustrated ports (112, 114) are termini, that is, paths terminated by ports directly linked to Router 1 (102).

A further embodiment illustrated in FIG. 1A provides more than one router (102, 104) in the same broker-dealer system (128). In such embodiments, a processor (103) is typically programmed also to communicate (183), upon startup but after receiving the contents of the port configuration files (170, 172), the contents of the path table (108) in a first router (102) to a second router (104). In the illustrated example, communicating the contents of the path table (108) to the second router (104) would have the effect of storing in Path Table 2(110) the path data structures identified with port codes designating Router as the terminus port of the path represented by a path data structure (162, 164, 166, 168 on FIG. 1B). As mentioned above in our discussion of the method aspects, it is reasonable to depict a router as a "terminus port" in these circumstances because, just as ports typically implement the first link in a path between a router and a market, a router in multi-router embodiments often implements the first link in a path from a second router to one or more markets.

In this example embodiment, the path data structures so communicated to Router 2 (104) would have their hop counts incremented by one. In some embodiments, a transmitting processor (103) is programmed to increment the hop count before the path data structures are communicated to another router (104). In other embodiments, a receiving processor (105) is programmed to increment the hop count after the path data structures are communicated from another router (102). In the illustrated example embodiment, the path data structure in Router 2 that represents the path from Router 1 to ISLD (162 on FIG. 1B) would have a hop count of 2 whereas its corresponding path data structure in Router 1 (150 on FIG. 1B) would have a hop count of 1.

The hop counts are increased in Path Table 2 so as to treat the link from Router 1 to a port as a hop. For a path originating in a port to which Router 1 is directly connected, however, the connection from Router 1 to a port is not treated as a hop. Similarly, for paths for which Router 1 is treated as a terminus having a port code (162, 164, 166, 168 on FIG. 1B), the connection between Router 1 and Router 2 is not counted as a hop.

In embodiments of the kind in which path data structures are loaded at startup from port configuration files (170, 172, 174) coupled through ports (112, 114, 116), there is typically little or no need for human data entry of path data structures into router path tables. In such embodiments, however, human operators typically do use terminal keyboards to type path data structures directly into the port configuration files (170, 172, 174) associated with ports (112, 114, 116).

Although the illustrated example embodiment of FIG. 1A shows only two routers (102, 104) coupled (106) for data communications within a single broker-dealer system, other embodiments will use any number of routers so coupled. In addition, although the two routers (102, 104) of the illustrated example embodiment are shown as components of the same broker-dealer system, in other embodiments routers will be located in separate broker-dealer systems. This fact is illustrated in FIG. 1A by use of the reference line (184), by which it can be seen that the portions of the broker-dealer system on either side of the line (184) can be implemented as separate broker-dealer systems in which routers (102, 104) located at arbitrary distances from one another are coupled (106) for purposes of data communications. Broker-dealers having routers coupled to ports coupled through paths to markets can therefore make such paths available to other broker-dealers who do not themselves have available the same paths.

Making paths to markets available to broker-dealers that otherwise would not have them increases the number of orders available to markets, therefore increasing market liquidity. Making paths to markets available to broker-dealers who otherwise would not have them decreases pressure for all broker-dealers to support paths to all markets, resulting in reduced equipment costs to broker-dealers generally, resulting also in more efficient use of the equipment comprising routers and ports, and therefore also reducing the cost of providing services to securities traders and investors.

In the example embodiment under discussion, as shown in FIG. 1A, in which path data structures are loaded from port configuration files at startup, the path tables (108, 110) are created, not through direct data entry through a terminal keyboard by a person, but by data communications between ports and routers at startup. In addition to port processors programmed to communicate the contents of port configuration files during startup communications, many embodiments include processors programmed to update path tables from time to time during normal operations by use of status update messages from the ports (112, 114, 116) to the routers (102, 104).

Ports in typical embodiments are computers having processors programmed to make calls to API routines for purposes of communications with the first-tier market to which the port is connected. If a call to an API routine returns an error code indicating that a market link is lost, the port processor in such embodiments is typically programmed in turn to report that fact in a message to a router, and the router is typically programmed to receive such messages and to record in a path table data indicating that the paths for which the port is a terminus are not available for sending orders. In embodiments in which a first router is connected to other routers using paths that include the failed market link, the first router is typically programmed to send to the other routers in turn status update messages to report the paths' unavailability. Some embodiments encode the fact that paths are not available in a status field, such as the one illustrated at reference (404) on FIG. 4. Other embodiments encode path unavailability by deleting from the path table the path data structures representing paths that have become unavailable. Other methods of encoding path unavailability may be used by other embodiments, all such methods being well within the scope of the present invention.

It is useful in many embodiments for a port to include a processor programmed to identify the port upon startup. That is, a port intended to implement a data communications link to the ISLD ECN, for example, in some embodiments will include a processor programmed to determine that the port is the ISLD port, or one of the ISLD ports, in the broker-dealer system in which the port is located. Identification of the port may be effected for many purposes all of which are well within the scope of the invention and which include for example performing programmed checks on orders and responses to improve reliability of data communications and communicating to a router the identity of the port.

One structure useful within the present invention for a port to identify itself at startup is shown in FIG. 1C. In the example embodiment of FIG. 1C, the identification of a port is encoded in its port configuration file by the fact that the port code is identical for all path data structures in the port configuration file. Port processors in such embodiments typically will be programmed to read the port configuration file and communicate the path data structures in the file to a router as described above. Port processors in such embodiments often will be programmed to store and retain in computer memory the value of the port code from the path data structures in the port configuration file.

An additional example embodiment shown in FIG. 1D illustrates an alternative structure useful in identifying a port at startup. In the example embodiment of FIG. 1D, the path data structures (151, 152, 154, 156, 149, 150, 161, 160) have no port codes as such, and the identity of the port is encoded as the terminus market code in a path data structure having a hop count of zero (151, 149, 161). In embodiments of the kind illustrated, the hop count of zero identifies a path data structure included in the port configuration file only for the purpose of identifying the port. That is, in the example embodiment illustrated in FIG. 1D, the three path data structures (151, 149, 161) are included in the port configuration files (171, 173, 174) only to identify ports; these path data structures are special purpose structures that do not represent actual paths as do the other path data structures shown in FIG. 1D.

Although the illustrated example embodiment uses a value of zero to encode that port identity is stored in the terminus market code in a particular path data structure, users skilled in the art will immediately realize that various embodiments can use any predetermined value stored in any data element in a path data structure to indicate that the path data structure carries a port code in a data element where the port code is not ordinarily found. In the illustrated example embodiment, the port code is stored in the data element usually reserved for the terminus market code. In various embodiments, the port code is stored in various locations, so long as the convention for locating the port code is predetermined. In addition, in various embodiments, the predetermined code, such as a zero, indicating that a particular path data structure is to be treated as a port identifier rather than as representing a path, is stored in various data elements including hop count, transaction cost, path latency, and combination codes. There are many methods and structures for using an abbreviated or alternative path data structure to identify a port, and all of them are well within the present invention.

Ports in embodiments that include path data structures encoding port identities as terminus market codes in path data structures having hop counts of zero typically include processors programmed to read from their port configuration files a path data structure having a hop count of zero, retain in computer memory the value of the port code stored in the terminus market code of that structure, discard that structure, read another path data structure from the port configuration file, add a port code to the new path data structure, and assign to the port code the value previously stored in computer memory. Port processors in such embodiments often are programmed to store the value of the port code in computer memory.

Ports in other embodiments using such path data structures, that is, special path data structures used to identify a port rather than a path, typically include processors programmed to read from the port configuration file into computer memory a first path data structure, the first path data structure having a hop count of zero, the first path data structure having a terminus market code containing a port code value; read a second path data structure from the port configuration file; optionally add a port code to the new path data structure if it does not already have a port code; and assign to the port code in the second path data structure the port code value from the terminus market code in the first path data structure. Although, these steps will be accomplished in many embodiments before communicating the resulting path data structures to routers where they will be used to identify paths rather than ports, some embodiments simply send the entire port configuration file to the router and let the router sort out which path data structures indicate port identities. Persons skilled in the art will realize that all three alternative methods and structures for identifying ports just discussed, as practiced in various embodiments, as well as many others, are all well within the scope of the present invention.

FIGS. 1C and 1D illustrate two example embodiments of path data structures useful for identifying ports upon startup. Other embodiments will use other data structures for identifying ports upon startup, all of which are well within the scope of the present invention.

A further embodiment of the invention as shown at reference number (210) in FIG. 12, and also as shown at reference number (210) in the illustrated embodiments of path data structures in FIGS. 2A, 2B, and 2C, includes among the path selection data elements in the path data structure a hop count. Hop count (210) is the number of data communications links comprising the path represented by the path data structure (e.g., reference 204 in FIG. 12).

Figure 13:
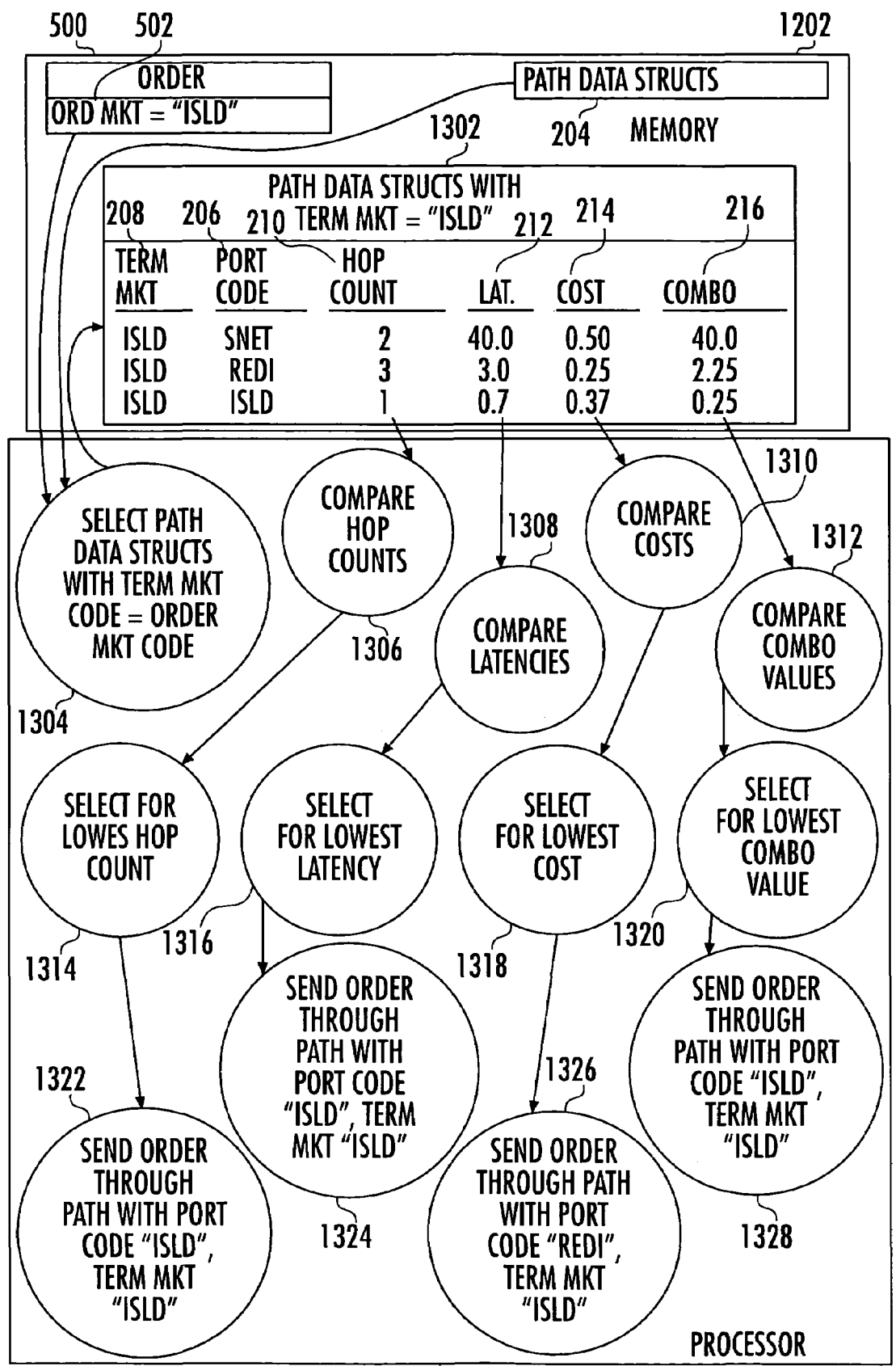
FIG. 13 illustrates the use of path selection data elements in a system for electronic orders for securities.

A still further embodiment shown in FIG. 13, provides a processor (1204) programmed to select (1304) from among path data structures (204) in memory (1302) the path data structures having terminus markets (208) equal to an order market (502), compare (1310) the values of hop count (210) among the path data structures (1302) having terminus market codes (208) equal to the order market code (502), and select (1314) the path whose path data structure indicates a lowest hop count for the path. In the specific example embodiment illustrated in FIG. 13, the path selected has a hop count of 1, and the port code (206) for the path selected is "ISLD." The terminus market for the path is the same as the order market, that is, "ISLD." The path selected for sending (1326) the order, therefore, is the path having a port code of "ISLD" and a terminus market of "ISLD."

Referring again to FIG. 12, an embodiment of the invention is seen in which one of the path selection data elements (210, 212, 214, 216) comprises path latency (212). A still further embodiment shown in FIG. 13, provides a path data structure in which at least one of the path selection data elements comprises a path latency, the embodiment further providing a processor (1204) programmed to select (1304) from among path data structures (204) in memory (1302) the path data structures having terminus markets (208) equal to an order market (502), compare (1308) the values of path latency (214) among the path data structures (1302) having terminus market codes (208) equal to the order market code (502), and select (1316) the path whose path data structure indicates a lowest path latency for the path. In the specific example embodiment illustrated in FIG. 13, the path selected has a path latency of 0.7 seconds, and the port code (206) for the path selected is "ISLD." The terminus market for the path is the same as the order market, that is, "ISLD." The path selected for sending (1326) the order, therefore, is the path having a port code of "ISLD" and a terminus market of "ISLD."

Turning again to FIG. 12, an embodiment of the invention is seen in which one of the path selection data elements (210, 212, 214, 216) comprises a transaction cost (214) for the terminus market. A still further embodiment shown in FIG. 13, provides a processor (1204) programmed to select (1304) from among path data structures (204) in memory (1302) the path data structures having terminus markets (208) equal to an order market (502), compare (1310) the values of transaction cost (214) among the path data structures (1302) having terminus market codes (208) equal to the order market code (502), and select (1318) the path whose path data structure indicates a lowest transaction cost for the terminus market of the path. In the specific example embodiment illustrated in FIG. 13, the path selected has a transaction cost of $0.25, and the port code (206) for the path selected is "REDI." The terminus market for the path is the same as the order market, that is, "ISLD." The path selected for sending (1326) the order, therefore, is the path having a port code of "REDI" and a terminus market of "ISLD."

Turning again to FIG. 12, an even further embodiment of the invention is seen in which one of the path selection data elements (210, 212, 214, 216) comprises a combination (216) of hop count, path latency, and transaction cost for the path destination market. The particular embodiment illustrated implements the combination code (216) as the product of hop count (210) multiplied by path latency (212) further multiplied by transaction cost (214). Other embodiments implement combination codes as, for example, sums of hop count plus path latency plus transaction cost. Still other embodiments utilize only path latency and transaction cost in a combination code. There are many ways of combining hop count, path latency, and/or transaction cost for use in selecting paths for orders, all of which are well within the scope of the present invention.

An even further embodiment shown in FIG. 13, provides a processor (1204) programmed to select (1304) from among path data structures (204) in memory (1302) the path data structures having terminus markets (208) equal to an order market (502), compare (1312) the values of a combination code (214) among the path data structures (1302) having terminus market codes (208) equal to the order market code (502), and select (1320) the path whose path data structure indicates a lowest value for the combination code. In the specific example embodiment illustrated in FIG. 13, the path selected has a combination code value of 0.25, and the port code (206) for the path selected is "ISLD." The terminus market for the path is the same as the order market, that is, "ISLD." The path selected for sending (1328) the order, therefore, is the path having a port code of "ISLD" and a terminus market of "ISLD."

The additional example embodiment illustrated in FIG. 14 includes a form of path data structure having among its path selection data elements an override code (1402). An "override" is a designation of a path to be selected for sending orders regardless of the value of other path selection data elements in path data structures representing paths to the same terminus market. The embodiment shown in FIG. 14 includes a processor (1204) programmed to select (1412, 1406) a path for the order (500), where the processor is further programmed to detect (1404) the presence of an override (1402) in the path selection data elements among path data structures having terminus market codes equal to the order market code (1416) and, if an override is detected, select (1406) the path having an override among paths represented by path data structures having terminus market codes equal to the order market code (1416). The embodiment shown in FIG. 14, includes the processor programmed to compare hop counts (1410), if no override is detected (1404), and select (1412) a path having the lowest hop count among the paths having terminus market codes equal to the order market code (1416).

The only path selection data element, other than the override, used in the embodiment illustrated in FIG. 14 is hop count (210). Overrides, however, are used in other embodiments with other kinds of path selection data elements including for example path latency, transaction cost, and combination codes. In the embodiment shown in FIG. 14, an override is encoded as a "1" in a data element specifically designated as an override code (1402). In alternative embodiments, overrides are encoded in various path selection data elements. In the alternative embodiments of path data structures illustrated in FIG. 14A, for example, an override is encoded as a "0" in a combination code (1418), as a "0" in a hop count (1420), and as a "0.00" in a path latency data element (1422). FIG. 14A also illustrates two example arrangements of path selection data elements. The second set of path data structures (1424) in FIG. 14A includes two path selection data elements, hop count and path latency. The other path selection data structures illustrated in FIG. 14A include only one path selection data element each, respectively, a combination code (1426) and a path latency (1428). Overrides, however are implemented in various embodiments with many arrangements of path selection data elements. There are many methods and structures for encoding overrides in path data structures, and all such methods and structures are well within the scope of the present invention.

What is claimed is:

1. A method of selecting from among multiple paths, in a broker-dealer system for automated trading of securities, a path for sending an order for securities to a terminus market, the broker-dealer system including at least one router, the router being coupled for data communications to at least one port, the broker-dealer system including also at least one port, the port being coupled for data communications through at least one path to at least one terminus market, the port optionally including at least one port configuration file, the multiple paths each including at least one direct link between a port and a first-tier market and optionally one or more additional links between the first-tier market and other markets, each of the multiple paths having a first terminus at a port and a second terminus at a terminus market, terminus markets being markets to which orders for securities are sent to be executed, the method comprising the steps of providing one or more path data structures representing a path connecting the broker dealer system to one or more terminus markets, each path data structure further comprising:
one or more path identification data elements, and
one or more path selection data elements comprising a path status data element;
receiving an order comprising an order market code;
making calls to API routines, the API routines providing return values;
detecting return values that indicate whether a path is available for use in sending orders to a terminus market;
recording in the path status data element data representing detected changes in the status of the path; and
selecting, from the paths whose path data structures have terminus market codes with values equal to the value of the order market code, a path for the order dependent upon the values of the path selection data elements;
wherein one or more of the data elements comprising the path data structure uniquely identifies the path data structure and at least one of the terminus markets is a terminus market in more than one path.

2. The method of claim 1 wherein the path identification data elements comprise a path identification code, wherein the path identification code uniquely identifies a path.

3. The method of claim 1 wherein the path identification data elements comprise a port code and a terminus market code, and the port code and the terminus market code together uniquely identify a path.

4. The method of claim 1 wherein providing one or more path data structures further comprises the steps of:
detecting changes in a status of a changed path; and
recording in the path data structure data representing detected changes in the status of the changed path.

5. The method of claim 4 wherein recording data representing detected changes in the status of the changed path further comprises encoding path status into one or more of the path selection data elements as a predetermined value.

6. The method of claim 1 wherein receiving an order comprising an order market code further comprises receiving an order data structure comprising:
the order market code,
a symbol,
a side,
a quantity,
a time-in-force, and
a price.

7. The method of claim 1 wherein the path identification data elements comprise a connection code, a port code, and a terminus market code, and the connection code, the port code, and the terminus market code together uniquely identify the path represented by the path data structure.

8. The method of claim 7 wherein the connection code further comprises a socket identification code.

9. The method of claim 1 wherein providing one or more path data structures further comprises the steps of:
reading from a port configuration file path data structures representing paths for which the port is a terminus, and
communicating the read path data structures to a first router.

10. The method of claim 9 further comprising communicating from the first router to a second router the read path data structures.

11. The method of claim 10 wherein the first router and second router are included in the same broker-dealer system.

12. The method of claim 11 wherein the second router is located remotely from the first router.

13. The method of claim 10 wherein the first router is included in a first broker-dealer system and the second router is included a second broker-dealer system.

14. The method of claim 13 wherein the second router is located remotely from the first router.

15. The method of claim 10, wherein the path identification data elements comprise a port code, the method further comprising storing in the port code of the read path data structures communicated from the first router to the second router a code identifying the first router as the terminus port for the paths represented by the read path data structures.

16. The method of claim 10, wherein the path selection data elements comprise a hop count, the method further comprising incrementing the hop count in the read path data structures communicated from the first router to the second router.

17. The method of claim 1 wherein providing one or more path data structures further comprises updating path status data stored in the path data structures.

18. The method of claim 17 wherein updating the path status data stored in the path data structures further comprises receiving in a router status update messages from ports.

19. The method of claim 1 further comprising identifying a port.

20. The method of claim 19 wherein identifying a port further comprises encoding a port identification in a path data structure in a configuration file for a port and reading the port identification from the configuration file.

21. The method of claim 20 wherein encoding a port identification in a path data structure in a configuration file for a port further comprises encoding the port identification in a port code.

22. The method of claim 20 wherein encoding a port identification in a path data structure in a configuration file for a port further comprises the steps of:
    storing the port identification in a terminus market code in a path data structure having a terminus market code and a hop count, and
    setting the hop count to zero.

23. The method of claim 22 comprising the further steps of:
    reading from the port configuration file into computer memory a first path data structure, the first path data structure having a hop count of zero, the first path data structure having a terminus market code containing a port code value;
    reading a second path data structure from the port configuration file;
    adding a port code to the second path data structure if it does not already have a port code; and
    assigning to the port code in the second path data structure the port code value from the terminus market code in the first path data structure.

24. The method of claim 1 wherein the path selection data elements in the path data structure comprise a hop count.

25. The method of claim 24 wherein selecting a path for the order further comprises the steps of:

comparing the hop counts of path data structures having terminus market codes equal to the order market code; and
selecting a path having a lowest hop count among paths represented by path data structures having terminus market codes equal to the order market code.

26. The method of claim 1 wherein one or more of the path selection data elements comprises path latency.

27. The method of claim 1 wherein one or more of the path selection data elements comprises a transaction cost for the path's terminus market.

28. A method of selecting from among multiple paths, in a broker-dealer system for automated trading of securities, a path for sending an order for securities to a terminus market, the broker-dealer system including at least one router, the router being coupled for data communications to at least one port, the broker-dealer system including also at least one port, the port being coupled for data communications through at least one path to at least one terminus market, the port optionally including at least one port configuration file, the multiple paths each including at least one direct link between a port and a first-tier market and optionally one or more additional links between the first-tier market and other markets, each of the multiple paths having a first terminus at a port and a second terminus at a terminus market, terminus markets being markets to which orders for securities are sent to be executed, the method comprising the steps of:
    providing one or more path data structures representing a path connecting the broker dealer system to one or more terminus markets, each path data structure further comprising:
        one or more path identification data elements, and
        one or more path selection data elements providing path latency by
        recording in a path time data structure a connection code, a port code, a terminus market code, and a send time when the order is sent to a terminus market,
        recording in the path time data structure a receive time when a response is received corresponding to the order,
        subtracting the send time from the receive time to yield a path latency, and
        storing the path latency in a path data structure;
    receiving an order comprising an order market code;
    comparing path latencies among path data structures having terminus market codes equal to the order market code; and
    selecting a path for the order having a lowest path latency among paths represented by path data structures having terminus market codes equal to the order market code,
    wherein one or more of the data elements comprising the path data structure uniquely identifies the path data structure and at least one of the terminus markets is a terminus market in more than one path.

29. The method of claim 28 wherein providing path latency comprises the further steps of:
    providing a sum having an initial value of zero;
    adding the difference amount to the sum, whereby the sum in increased by the difference amount;
    repeating the previous steps N times, wherein N is a predetermined number; and dividing the sum by N to yield a path latency.

30. A method of selecting from among multiple paths, in a broker-dealer system for automated trading of securities, a path for sending an order for securities to a terminus market, the broker-dealer system including at least one router, the router being coupled for data communications to at least one port, the broker-dealer system including also at least one port, the port being coupled for data communications through at least one path to at least one terminus market, the port optionally including at least one port configuration file, the multiple paths each including at least one direct link between a port and a first-tier market and optionally one or more additional links between the first-tier market and other markets, each of the multiple paths having a first terminus at a port and a second terminus at a terminus market, terminus markets being markets to which orders for securities are sent to be executed, the method comprising the steps of:

proviving one or more path data structures representing a path connecting the broker dealer system to one or more terminus markets, each path data structure further comprising:
  one or more path identification data elements, and
  one or more path selection data elements;
receiving an order comprising an order market code, and
selecting, from the paths whose path data structures have terminus market codes with values equal to the value of the order market code, a path for the order dependent upon the values of the path selection data elements;
wherein one or more of the data elements comprising the path data structure uniquely identifies the path data structure and at least one of the terminus markets is a terminus market in more than one path; and
wherein the path selection data elements comprise a combination code comprising a product of hop count, path latency, and transaction cost for the terminus market; and
wherein selecting a path for the order further comprises:
  selecting a path having a lowest combination code.

31. The method of claim 30 wherein the combination code comprises a sum of hop count, path latency, and transaction cost for the path's terminus market; and wherein selecting a path for the order comprises:
  selecting a path having a lowest combination code from the paths whose path data structures have terminus market codes with values equal to the value of the order market code.

32. A method of selecting from among multiple paths, in a broker-dealer system for automated trading of securities, a path for sending an order for securities to a terminus market, the broker-dealer system including at least one router, the router being coupled for data communications to at least one port, the broker-dealer system including also at least one port, the port being coupled for data communications through at least one path to at least one terminus market, the port optionally including at least one port configuration file, the multiple paths each including at least one direct link between a port and a first-tier market and optionally one or more additional links between the first-tier market and other markets, each of the multiple paths having a first terminus at a port and a second terminus at a terminus market, terminus markets being markets to which orders for securities are sent to be executed, the method comprising the steps of:

providing one or more path data structures representing a path connecting the broker dealer system to one or more terminus markets, each path data structure further comprising:
  one or more path identification data elements, and
  one or more path selection data elements comprising an override;
receiving an order comprising an order market code;
detecting the presence of an override in the path selection data elements among path data structures having terminus market codes equal to the order market code; and
selecting a path having an override among paths represented by path data structures having terminus market codes equal to the order market code;
wherein one or more of the data elements comprising the path data structure uniquely identifies the path data structure and at least one of the terminus markets is a terminus market in more than one path; and
wherein the override comprises a predetermined value stored in a data element for a member elected from the group consisting of hop count, path latency, transaction cost, and combination code.

33. A system for selecting from among multiple paths a path for sending an order to a terminus market for execution of the order, wherein the multiple paths each include at least one direct link between a port and a first-tier market system and optionally one or more additional links between the first-tier market system and other market systems, each of the multiple paths having a first terminus at a port and a second terminus at a terminus market, the system comprising:

a router, the router coupled for data communications to a port, the router further comprising a processor;
the port, coupled for data communications though a path to a terminus market, the port being a terminus of the path, the port optionally further comprising a configuration file;
the terminus market, coupled through the path to the port;
the processor programmed to:
  provide one or more path data structures representing the path connecting the port to the terminus market, the path data structure comprising:
    one or more path identification data elements, and
    one or more path selection data elements comprising a path status data element;
  make calls to API routines, the API routines providing return values;
  detect return values that indicate whether the changed path is available for use in sending orders for securities to a terminus market;
  record in the path status data element data representing detected changes in the status of the changed path;
  receive an order comprising an order market code; and
  select, from among paths whose path data structures have terminus market codes with values equal to the value of the order market code, a path for the order dependent upon the values of the path selection data elements;
and a computer memory coupled to the processor, the processor being further programmed to store in the computer memory the path data structure;
wherein one or more of the path identification data elements uniquely identifies the path represented by the path data structure and the terminus market is a terminus of more than one path.

34. The system of claim 33 wherein the path identification data elements comprise a path identification code, wherein the path identification code uniquely identifies one of the one or more paths connecting the broker dealer system to one or more terminus markets.

35. The system of claim 33 wherein the path identification data elements comprise a port code and a terminus market code, wherein the port code and the terminus market code together uniquely identify a path connecting a port to a terminus market.

36. The system of claim 33 wherein as part of providing one or more path data structures the processor is programmed to:

detect changes in a status of a changed path; and
record in the path data structure data representing detected changes in the status of the changed path.

37. The system of claim 36 wherein as part of recording data representing detected changes in the status of the changed path, the processor is programmed to encode path status into one or more of the path selection data elements as a predetermined value.

38. The system of claim 33 wherein as part of receiving an order comprising an order market code the processor is programmed to receive an electronic order message having an order data structure comprising:
   the order market code,
   a symbol,
   a side,
   a quantity,
   a time-in-force, and
   a price.

39. The system of claim 33 wherein the path identification data elements comprise a connection code, a port code, and a terminus market code, and the connection code, the port code, and the terminus market code together uniquely identify the path represented by the path data structure.

40. The system of claim 39 wherein the connection code further comprises a socket identification code.

41. The system of claim 33 wherein as part of providing one or more path data structures the processor is programmed to:
   read from a port configuration file path data structures representing paths for which the port is a terminus, and
   communicate the read path data structures to a second router.

42. The system of claim 33 further comprising a second router coupled for data communications to the first router, wherein the processor is further programmed to communicate from the first router to the second router the read path data structures.

43. The system of claim 42 wherein the first router and the second router are included in the same broker-dealer system.

44. The system of claim 43 wherein the second router is located remotely from the first router.

45. The system of claim 42 wherein the first router is included in a first broker-dealer system and the second router is included a second broker-dealer system.

46. The system of claim 45 wherein the second router is located remotely from the first router.

47. The system of claim 42, wherein the path identification data elements comprise a port code, and wherein the processor is further programmed to store in the port code of the read path data structures communicated from the first router to the second router a code identifying the first router as the terminus pod for the paths represented by the read path data structures.

48. The system of claim 42, wherein the path selection data elements comprise a hop count, and wherein the processor is further programmed to increment the hop count in the read path data structures communicated from the first router to the second router.

49. The system of claim 33 wherein as part of providing one or more path data structures the processor is programmed to update path status data stored in the path data structures.

50. The system of claim 49 wherein as part of updating the path status data stored in the path data structures, the processor is programmed to receive in a router status update messages from ports.

51. The system of claim 33, wherein the processor is further programmed to identify a port.

52. The system of claim 51 wherein as part of identifying a port the processor is programmed to encode a port identification in a path data structure in a configuration file for a port and read the port identification from the configuration file.

53. The system of claim 52 wherein as part of encoding a port identification in a path data structure in a configuration file for a port, the processor is programmed to store the port identification in a port code.

54. The system of claim 52 wherein as part of encoding a port identification in a path data structure in a configuration file for a port, the processor is programmed to:
   store the port identification in a terminus market code in a path data structure having a terminus market code and a hop count; and
   set the hop count to zero.

55. The system of claim 54 wherein the processor is further programmed to:
   read from the port configuration file into computer memory a first path data structure, the first path data structure having a hop count of zero, the first path data structure having a terminus market code containing a port code value;
   read a second path data structure from the port configuration file;
   add a port code to the second path data structure if it does not already have a port code; and
   assign to the port code in the second path data structure the port code value from the terminus market code in the first path data structure.

56. The system of claim 33 wherein one of the path selection data elements in the path data structure comprises a hop count.

57. The system of claim 56 wherein as part of selecting a path for the order the processor is programmed to:
   compare hop counts in path data structures having terminus market codes equal to the order market code; and
   select a path having a lowest hop count among paths represented by path data structures having terminus market codes equal to the order market code.

58. The system of claim 33 wherein one or more of the path selection data elements comprises a path latency.

59. The system of claim 33 wherein one of the path selection data elements in the path data structure comprises a transaction cost for the terminus market identified in the path data structure.

60. The system of claim 33 wherein the path selection data elements comprise a combination code further comprising a combination of hop count, path latency, and transaction cost for the path's terminus market.

61. The system of claim 60, wherein the combination code further comprises a product of hop count, path latency, and transaction cost for the path's terminus market; and
   wherein as part of selecting a path for the order the processor is programmed to select a path having a lowest combination code among paths represented by path data structures having terminus market codes equal to the order market code.

62. The system of claim 60, wherein the combination code further comprises a sum of hop count, path latency, and transaction cost for the path's terminus market, and wherein as part of selecting a path for the order the processor is programmed to select a path having a lowest combination code among paths represented by path data structures having terminus market codes equal to the order market code.

63. A system for selecting from among multiple paths a path for sending an order to a terminus market for execution of the order, wherein the multiple paths each include at least one direct link between a port and a first-tier market system and optionally one or more additional links between the first-tier market system and other market systems, each of the multiple paths having a first terminus at a port and a second terminus at a terminus market, the system comprising:

a router, the router coupled for data communications to a port, the router further comprising a processor;

the port, coupled for data communications though a path to a terminus market, the port being a terminus of the path, the port optionally farther comprising a configuration file;

the terminus market, coupled through the path to the port;

the processor programmed to provide one or more path data structures representing the path connecting the port to the terminus market, the path data structure comprising:

one or more path identification data elements, and one or more path selection data elements provide path latency by recording in a path time data structure a connection code, a port code, a terminus market code, and a send time when the order is sent to a terminus market, recording in the path time data structure a receive time when a response is received corresponding to the order, and subtracting the send time from the receive time to yield a path latency, and storing the path latency in a path data structure:

receive an order comprising an order market code; and compare path latencies in path data structures having terminus market codes equal to the order market code; and select a path for the order having a lowest path latency among paths represented by path data structures having terminus market codes equal to the order market code;

and a computer memory coupled to the processor, the processor being further programmed to store in the computer memory the path data structure;

wherein one or more of the path identification data elements uniquely identifies the path represented by the path data structure and the terminus market is a terminus of more than one path.

64. The system of claim 63 wherein the processor is programmed to provide path latency by further:

providing a sum having an initial value of zero;

adding the difference amount to the sum, whereby the sum in increased by the difference amount;

repeating the previous steps N times, wherein N is a predetermined number; and dividing the sum by N to yield a path latency.

65. A system for selecting from among multiple paths a path for sending an order to a terminus market for execution of the order, wherein the multiple paths each include at least one direct link between a port and a first-tier market system and optionally one or more additional links between the first-tier market system and other market systems, each of the multiple paths having a first terminus at a port and a second terminus at a terminus market, the system comprising:

a router, the router coupled for data communications to a port, the router further comprising a processor;

the port, coupled for data communications through a path to a terminus market, the port being a terminus of the path, the port optionally further comprising a configuration file;

the terminus market, coupled through the path to the port;

the processor programmed to:

provide one or more path data structures representing the path connecting the port to the terminus market, the path data structure comprising: one or more path identification data elements, and one or more path selection data elements comprising an override;

receive an order comprising an order market code; and detect the presence of an override in the path selection data elements among path data structures having terminus market codes equal to the order market code; and select a path having an override among paths represented by path data structures having terminus market codes equal to the order market code;

and a computer memory coupled to the processor, the processor being further programmed to store in the computer memory the path data structure;

wherein one or more of the path identification data elements uniquely identifies the path represented by the path data structure and the terminus market is a terminus of more than one path, and wherein the override comprises a predetermined value in a data element for a member elected from the group consisting of hop count, path latency, transaction cost, and combination code.

* * * * *